(12) United States Patent
Jeon et al.

(10) Patent No.: US 11,664,940 B2
(45) Date of Patent: May 30, 2023

(54) MANAGING LINK QUALITY AND USING PARTIAL SUBFRAMES IN WIRELESS TELECOMMUNICATION NETWORKS

(71) Applicant: Apple Inc., Cupertino, CA (US)

(72) Inventors: Jeongho Jeon, San Jose, CA (US); Huaning Niu, San Jose, CA (US); Wenting Chang, Beijing (CN); Jinyu Zhang, Beijing (CN); Dae Won Lee, Portland, OR (US); Alexei Davydov, Nizhny Novgorod (RU); Kyeongin Jeong, Portland, OR (US); Candy Yiu, Portland, OR (US)

(73) Assignee: Apple Inc., Cupertino, CA (US)

( * ) Notice: Subject to any disclaimer, the term of this patent is extended or adjusted under 35 U.S.C. 154(b) by 107 days.

(21) Appl. No.: 16/465,225

(22) PCT Filed: Aug. 13, 2018

(86) PCT No.: PCT/US2018/046549
§ 371 (c)(1),
(2) Date: May 30, 2019

(87) PCT Pub. No.: WO2019/033118
PCT Pub. Date: Feb. 14, 2019

(65) Prior Publication Data
US 2021/0281368 A1    Sep. 9, 2021

Related U.S. Application Data

(60) Provisional application No. 62/547,304, filed on Aug. 18, 2017, provisional application No. 62/544,516, filed on Aug. 11, 2017.

(51) Int. Cl.
*H04L 1/20* (2006.01)
*H04L 5/00* (2006.01)
(Continued)

(52) U.S. Cl.
CPC ........... *H04L 1/201* (2013.01); *H04L 5/0007* (2013.01); *H04L 5/0048* (2013.01);
(Continued)

(58) Field of Classification Search
CPC ..................................................... H04L 5/0094
See application file for complete search history.

(56) References Cited

U.S. PATENT DOCUMENTS

2013/0252606 A1    9/2013  Nimbalker et al.
2014/0369242 A1*  12/2014  Ng ........................ H04L 5/1469
                                                370/280

(Continued)

FOREIGN PATENT DOCUMENTS

| EP | 1811684 A2     | 7/2007 |
| WO | 2015/112072 A1 | 7/2015 |
| WO | 2017/061939 A1 | 4/2017 |

OTHER PUBLICATIONS

International Preliminary Report on Patentability dated Feb. 11, 2020 for PCT Application PCT/US2018/046549.
(Continued)

*Primary Examiner* — Abdeltif Ajid
(74) *Attorney, Agent, or Firm* — Eschweiler & Potashnik, LLC

(57) ABSTRACT

A user equipment (UE) may assess a radio link quality of a plurality of frames for communication, via the interface to the RF circuitry, with a radio access network (RAN) node. When the radio link quality of a frame, of the plurality of frames, is below an out-of-sync (OOS) threshold, the UE may indicate that the frame is OOS. When the radio link quality of a frame, of the plurality of frames, is above an in-sync (IS) threshold that the frame is IS. Additionally, or alternatively, the UE may process information, received from the RAN node indicating a partial subframe, of a subframe, to be used to transmit uplink control information
(Continued)

(UCI) to the RAN node. The UE ma also perform UCI mapping for using of the partial subframe to transmit UCI via a physical uplink control channel (PUSCH), and proceed by using the partial subframe to communicate the UCI to the RAN node.

15 Claims, 19 Drawing Sheets

(51) Int. Cl.
*H04L 27/26* (2006.01)
*H04W 24/08* (2009.01)
*H04W 56/00* (2009.01)
*H04W 72/04* (2009.01)

(52) U.S. Cl.
CPC ........ *H04L 5/0053* (2013.01); *H04L 27/2656* (2013.01); *H04W 24/08* (2013.01); *H04W 56/0045* (2013.01); *H04W 72/0413* (2013.01)

(56) References Cited

U.S. PATENT DOCUMENTS

| | | |
|---|---|---|
| 2015/0126206 A1 | 5/2015 | Krishnamurthy et al. |
| 2018/0248642 A1* | 8/2018 | Si .................... H04L 27/26025 |
| 2018/0278403 A1* | 9/2018 | Yerramalli ............ H04L 5/0094 |
| 2019/0037538 A1* | 1/2019 | Jiang .................... H04W 72/04 |
| 2019/0159266 A1* | 5/2019 | Kim .................. H04W 72/0446 |
| 2019/0289635 A1* | 9/2019 | Wang ................ H04W 74/0808 |
| 2020/0127798 A1* | 4/2020 | Yang .................... H04W 16/14 |
| 2020/0295892 A1* | 9/2020 | Oh ...................... H04W 74/006 |
| 2021/0298045 A1* | 9/2021 | Kim .................. H04W 74/0808 |

OTHER PUBLICATIONS

International Search Report and Written Opinion dated Jan. 16, 2019 for PCT Application PCT/US2018/046549.

* cited by examiner

MANAGING LINK QUALITY AND USING PARTIAL SUBFRAMES IN WIRELESS TELECOMMUNICATION NETWORKS

RELATED APPLICATIONS

This application is a National Phase entry application of International Patent Application No. PCT/US2018/046549 filed Aug. 13, 2018, which claims priority to U.S. Provisional Patent Application No. 62/544,516, which was filed on Aug. 11, 2017, and of U.S. Provisional Patent Application No. 62/547,304, which was filed on Aug. 18, 2017, incorporated by reference in its entirety.

BACKGROUND

Wireless telecommunication networks may include user equipment (UE) (e.g., smartphones, tablet computers, laptop computers, etc.) radio access networks (RANs) (that often include one or more base stations), and a core network. A UE may connect to the core network by communicating with the RAN and registering with the core network. Communications between the UE and the RAN may occur over one or more wireless channels. Among the processes and procedures that may relate to communications between UEs and RANs are those relating to the management and reporting of radio link quality and the configuration and use of subframe structures.

BRIEF DESCRIPTION OF THE DRAWINGS

Embodiments described herein will be readily understood by the following detailed description in conjunction with the accompanying drawings. To facilitate this description, like reference numerals may designate like structural elements. Embodiments are illustrated by way of example and not by way of limitation in the figures of the accompanying drawings.

DETAILED DESCRIPTION OF PREFERRED EMBODIMENTS

The following detailed description refers to the accompanying drawings. The same reference numbers in different drawings may identify the same or similar elements. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Radio link monitoring (RLM) by user equipment (UE) may include a procedure of measuring link, connection, signal, etc., quality between the UE and the serving cell (e.g., a base station, radio access network (RAN) node, etc.). A UE may perform RLM by measuring and determining whether link quality is good (e.g., in-sync) or bad (e.g., out-of-sync). RLM may give rise to limitations when the periodicity of a reference signal (RS) available for RLM measurement is relatively long (e.g., 160 milliseconds (ms)) since measurements of the RLM RS may only occur with the RLM RS transmission periodicity. Having long in-sync/out-of-sync (IS/OOS) reporting can result in the UE not being able to, for example, recognize a radio link failure promptly and, in turn, result in a high rate of dropped calls and/or interruptions in data services. In some Long-Term Evolution (LTE) networks, the RS available for RLM measurements may be transmitted every subframe (e.g., every 1 ms) and therefore, the UE may only have access to perform RLM measurements at 1 ms intervals. In such networks, attempts have been made to increase the UE's ability to promptly recognize radio link failures by transmitting RSs more frequently (i.e., with greater density); however, doing so often amounts to an undesirable allocation of network resource.

The techniques, described herein, may provide measurement procedures for RLM that may enable quicker, more efficient IS/OOS reporting, relative to the RLM RS periodicity implemented by a RAN node. In some embodiments, this may be achieved by using interference measurement resources (IMR) in addition to RS for RLM. IMR may be configured by not transmitting signals in certain radio resources, and thereby enable the UE capture, measure, etc., just the interference component of the RAN. Since IMR may, essentially, include the absence of transmitting a signal over a certain radio resource, the use of IMR for RLM purposes may provide a considerably less resource-intensive solution to promptly detecting radio link failures. In some embodiments, as described herein, the IMR for RLM may also, or alternatively, be shared for channel state information (CSI) estimation.

Figure 1:
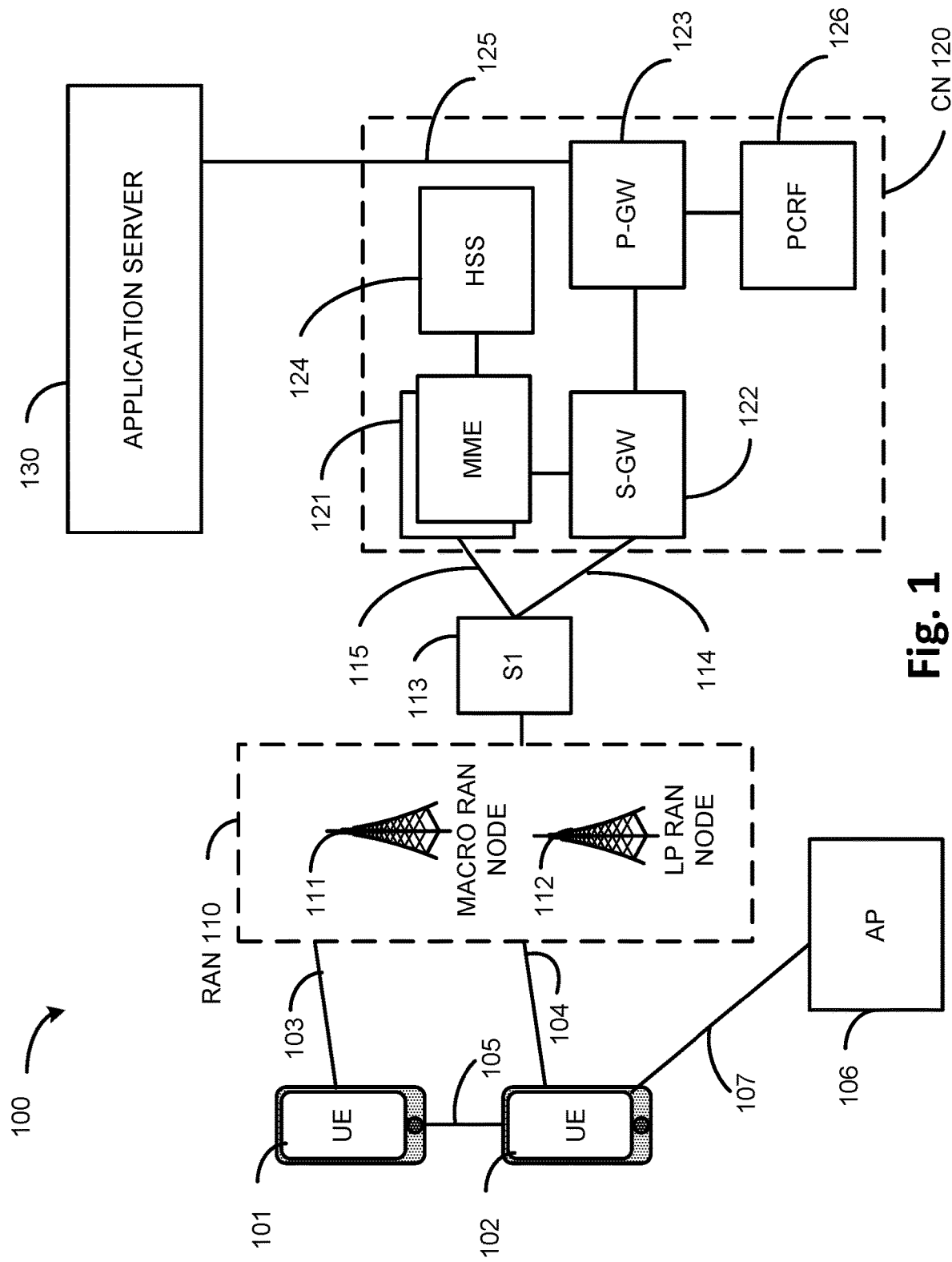
FIG. 1 illustrates an architecture of a system of a network in accordance with some embodiments.

FIG. 1 illustrates an architecture of a system 100 of a network in accordance with some embodiments. The system 100 is shown to include UE 101 and a UE 102. The UEs 101 and 102 are illustrated as smartphones (e.g., handheld touch-screen mobile computing devices connectable to one or more cellular networks) but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 101 and 102 can comprise an Internet of Things (IoT) UE or Narrowband (NB-IoT) UE, which can comprise a network access layer designed for low-power IoT applications utilizing short-lived UE connections. An IoT UE can utilize technologies such as machine-to-machine (M2M), machine-type communications (MTC), enhanced MTC, for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 and 102 may be configured to connect, e.g., communicatively couple, with a radio access network (RAN) 110—the RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as a connection consistent with any IEEE 802.11 protocol, wherein the AP 106 would comprise a wireless fidelity (Wi-Fi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, eNBs, next Generation NodeBs (gNB), RAN nodes, and so forth, and can comprise ground stations (e.g., terrestrial access points) or satellite stations providing coverage within a geographic area (e.g., a cell). The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as an enhanced resource element groups (EREGs). An ECCE may have other numbers of EREGs in some situations.

The RAN 110 is shown to be communicatively coupled to a core network (CN) 120—via an S1 interface 113. In embodiments, the CN 120 may be an evolved packet core (EPC) network, a NextGen Packet Core (NPC) network, or some other type of CN. In this embodiment, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities may include lawful intercept, charging, and some policy enforcement.

The P-GW 123 may terminate an SGi interface toward a PDN. The P-GW 123 may route data packets between the EPC network 123 and external networks such as a network including the application server 130 (alternatively referred to as application function (AF)) via an Internet Protocol (IP) interface 125. Generally, the application server 130 may be an element offering applications that use IP bearer resources with the core network (e.g., UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Enforcement Function (PCRF) 126 is the policy and charging control element of the CN 120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

The quantity of devices and/or networks, illustrated in FIG. 1, is provided for explanatory purposes only. In practice, system 100 may include additional devices and/or networks; fewer devices and/or networks; different devices and/or networks; or differently arranged devices and/or networks than illustrated in FIG. 1. For example, while not shown, environment 100 may include devices that facilitate or enable communication between various components shown in environment 100, such as routers, modems, gateways, switches, hubs, etc. Alternatively, or additionally, one or more of the devices of system 100 may perform one or more functions described as being performed by another one or more of the devices of system 100. Additionally, the devices of system 100 may interconnect with each other and/or other devices via wired connections, wireless connections, or a combination of wired and wireless connections. In some embodiments, one or more devices of system 100 may be physically integrated in, and/or may be physically attached to, one or more other devices of system 100. Also, while "direct" connections may be shown between certain devices in FIG. 1, some of said devices may, in practice, communicate with each other via one or more additional devices and/or networks.

Figure 2:
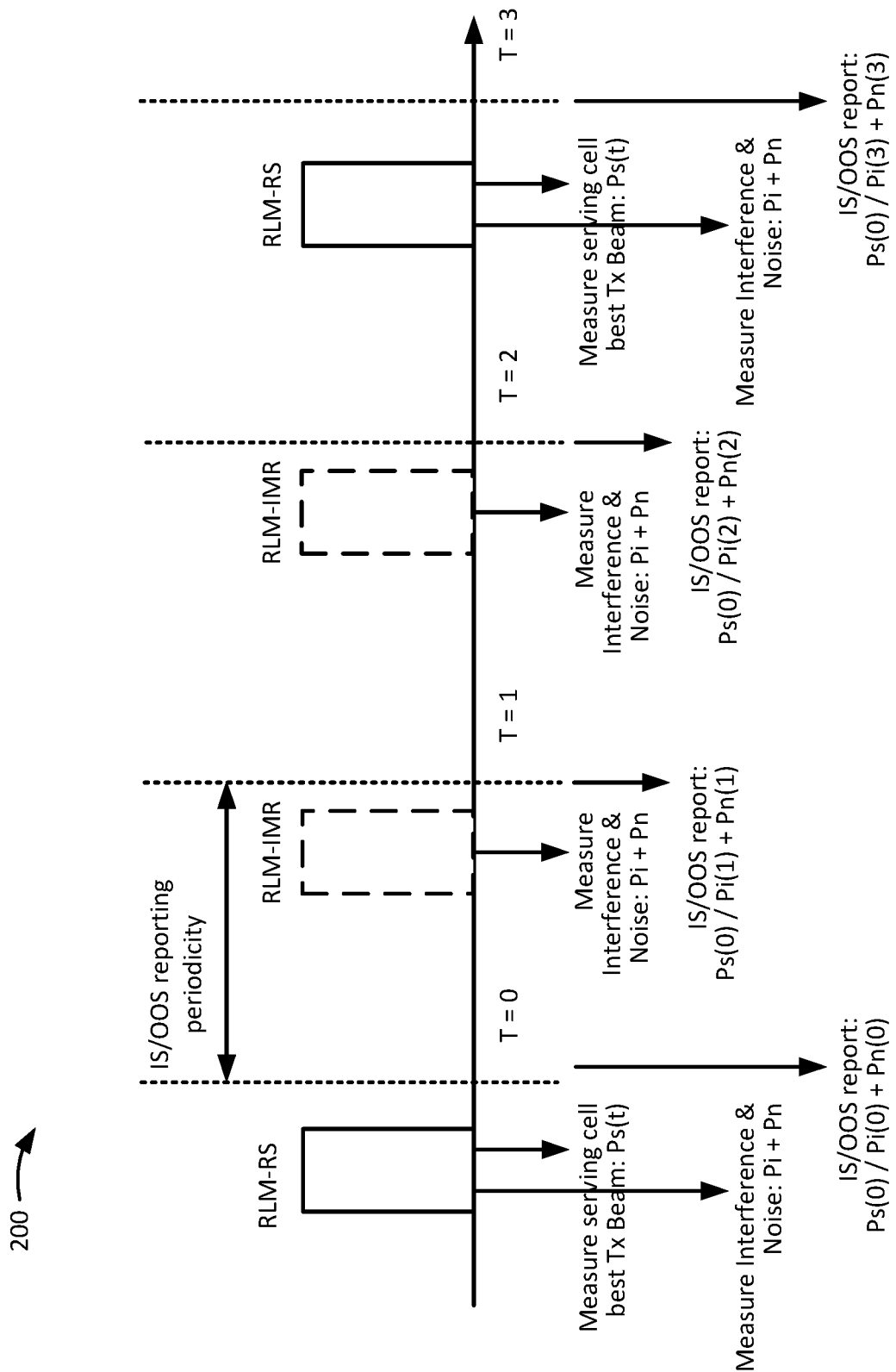
FIG. 2 is a block diagram of an example of radio link monitoring (RLM) of a reference signal (RS) (RLM-RS) and RLM of an IMR (RLM-IMR) to compute in sync and out-of-sync (IS/OOS) conditions.

FIG. 2 is a block diagram of an example 200 of RLM of a RS (RLM-RS) and RLM of an IMR (RLM-IMR) to compute IS/OOS. As shown, UE 101 may measure a level or degree of signal interference (Pi) and noise ratio (SINR) (Pn). UE 101 may also perform RLM-RS by measuring a best (e.g., strongest, clearest, etc.) transmission (Tx) beam (Ps(t), where t is time) from RAN node 101. Additionally, UE 101 may determine, generate, produce, etc., an IS/OOS report based on the Tx beam measurement and SINR. For example, as shown in FIG. 2, the IS/OOS report may be determined based on the following relationship: Ps(0)/Pi(0)+Pn(0).

As shown, prior to the next RLM-RS procedure, UE 101 may perform one or more RLM-IMR procedures. For example, leading up to T=1, UE 101 may again measure a SINR and generate an IS/OSS report based on the following relationship: Ps(0)/(Pi(1)+Pn(1)). Similarly, leading up to T=2, UE 101 may measure a SINR and generate an IS/OSS report based on the following relationship: Ps(0)/(Pi(2)+Pn(2)). Further, leading up to T=3, UE 101 may again perform RLM-RS and RLM-IMR, and generate an IS/OOS report based on the following relationship: Ps(3)/Pi(3)+Pn(3). As such, UE 101 may use RLM-IMR to enhance IS/OOS reporting periodicity, which may enable UE 101 to promptly recognize and/or respond to link failures and/or interruptions.

Figure 3:
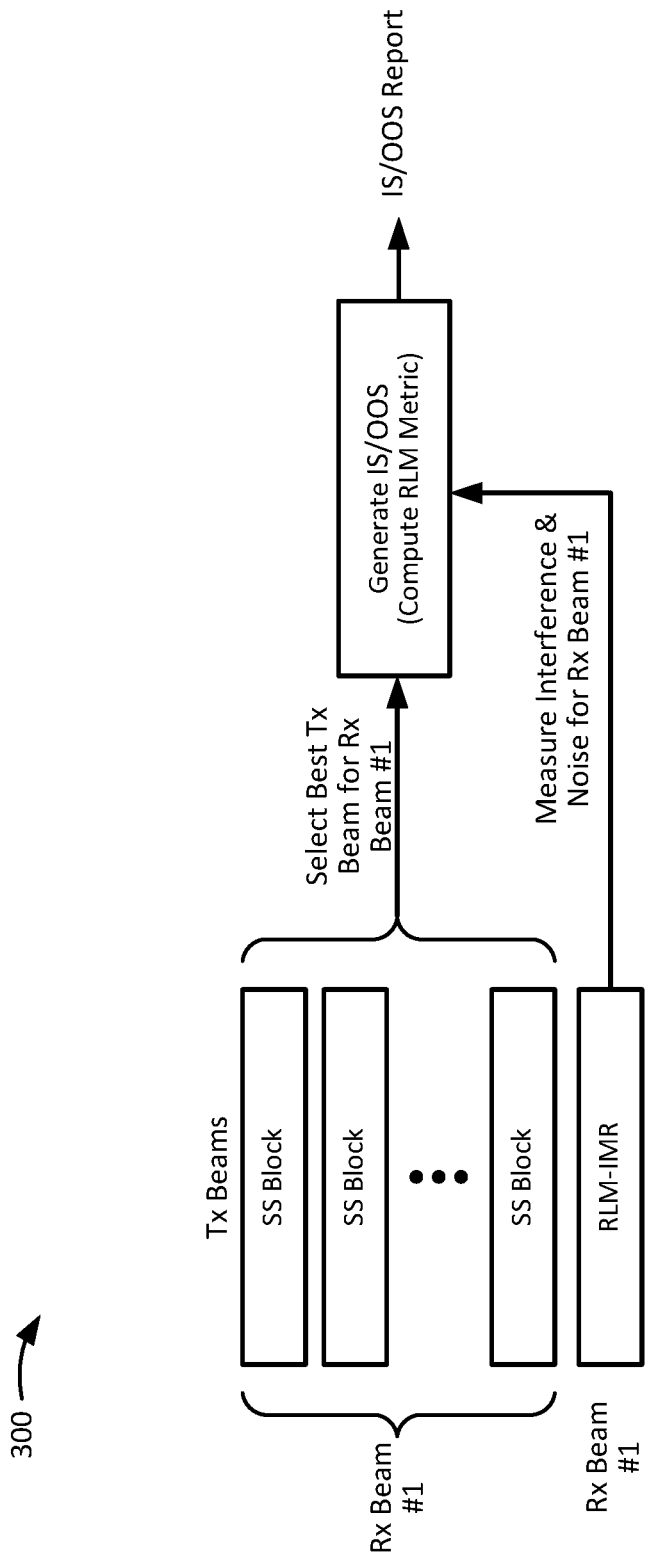
FIGS. 3 and 4 are block diagrams of examples for generating an IS/OOS report for a particular beam pair link (BPL)
Figure 4:
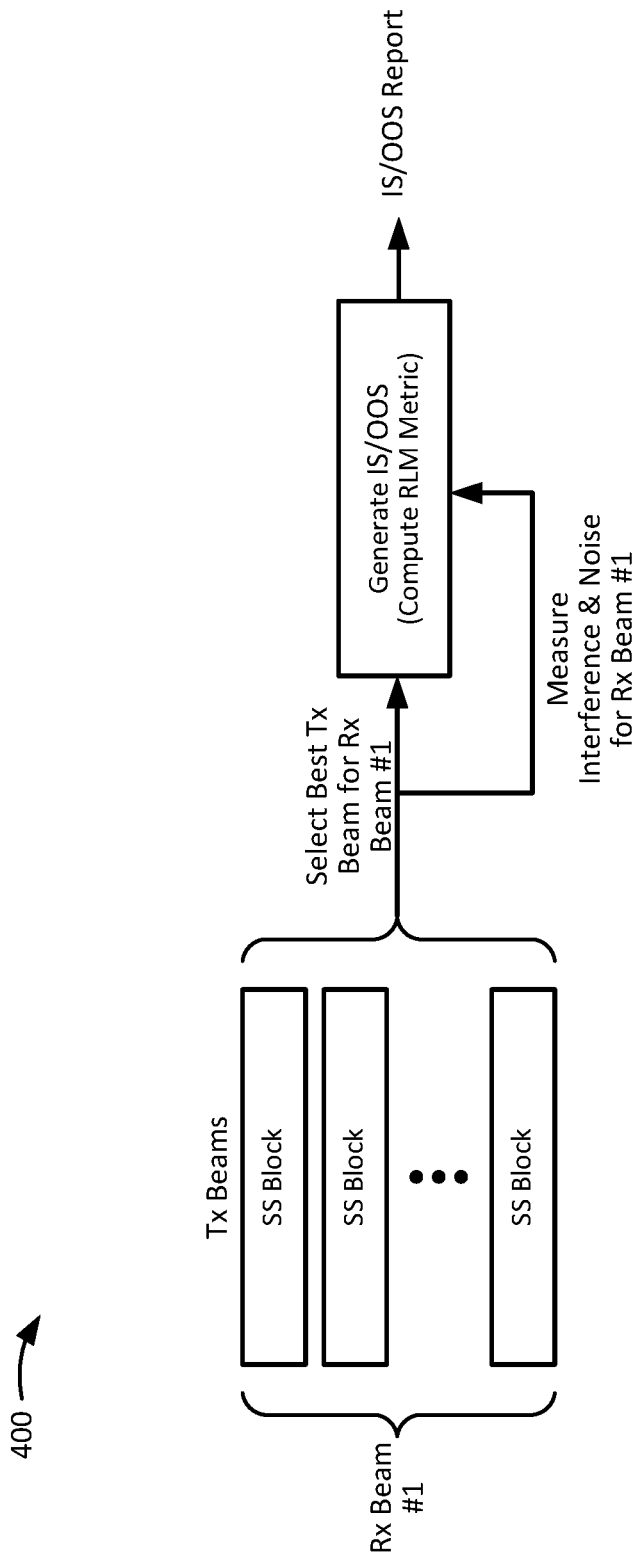

FIGS. 3 and 4 are block diagrams of examples 300 and 400 for generating an IS/OOS report for a particular beam pair link (BPL). If/when RAN node 111 is operating with multiple Tx beams, UE 101 may generate, determine, etc., serving cell link quality based on the best Tx beam with respect to a particular receive (Rx) beam. For example, as shown in FIG. 3, when multiple Tx beams are used between UE 101 and RAN node 111, UE 101 may determine, select, etc., the best Tx beam (e.g., the Tx beam with the best synchronization signal (SS) block, signal-to-noise ratio (SNR), etc.) for a corresponding Rx beam (e.g., Rx beam #1) and may use RLM-IMR to measure a degree, value, condition, etc., of interference and noise for the Rx beam (e.g., Rx beam #1). UE 101 may also, or alternatively, measure, determine, etc., an interference and noise level for the Rx beam (e.g., Rx beam #1). Additionally, UE 101 may generate an IS/OOS report, which may include a RLM metric based on the interference and noise of the Rx beam. UE 101 may operate in accordance with the IS/OOS report (e.g., to address a link failure between UE 101 and RAN node 111). An RLM metric, as described herein, may include a value representing a measured level of or degree of an RS resource being IS and/or OOS with higher layers.

Figure 5:
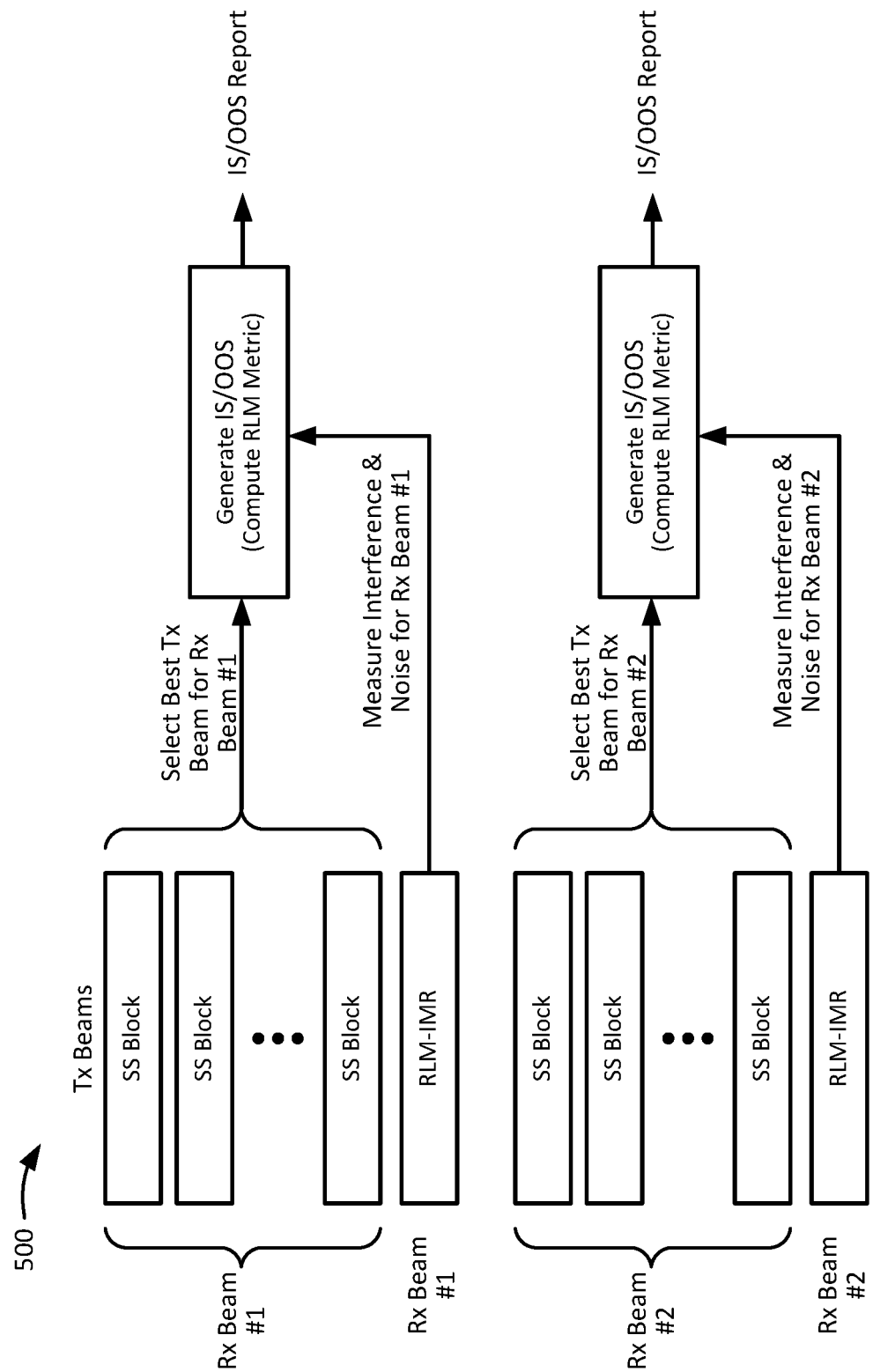
FIGS. 5, 6 and 7 are block diagrams of examples for generating IS/OOS reports for multiple BPLs.

UE 101 may be configured with a BPL that corresponds to a particular Tx beam and a particular Rx beam. In such scenarios, UE 101 may be configured to use the Rx beam from the configured BPL to compute the RLM metric. As shown in FIGS. 4 and 5, when computing the RLM metric, UE 101 may measure an interference component corresponding to resource(s) used for the RLM-RS procedure and/or the RLM-IMRs procedure. As such, FIG. 3 includes an example of a RLM metric being computed from the serving cell signal power measured and estimated from an SS block that is associated with the best Tx beam with a particular Rx beam (e.g., Rx beam #1) and neighbor cell interference power measured and estimated from the RLM-IMR procedure. By contrast, FIG. 4 includes an example of the RLM metric being computed from the serving cell signal power measured and estimated from the SS block that is associated with the best Tx beam with a particular Rx beam (e.g., Rx beam #1) and neighbor cell interference power measured and estimated from the same set of resources of the SS block used to make serving cell measurements. In some embodiments, the SS blocks shown in FIGS. 3 and 4 may be replaced by channel state information reference signal (CSI-RS) information.

Figure 6:
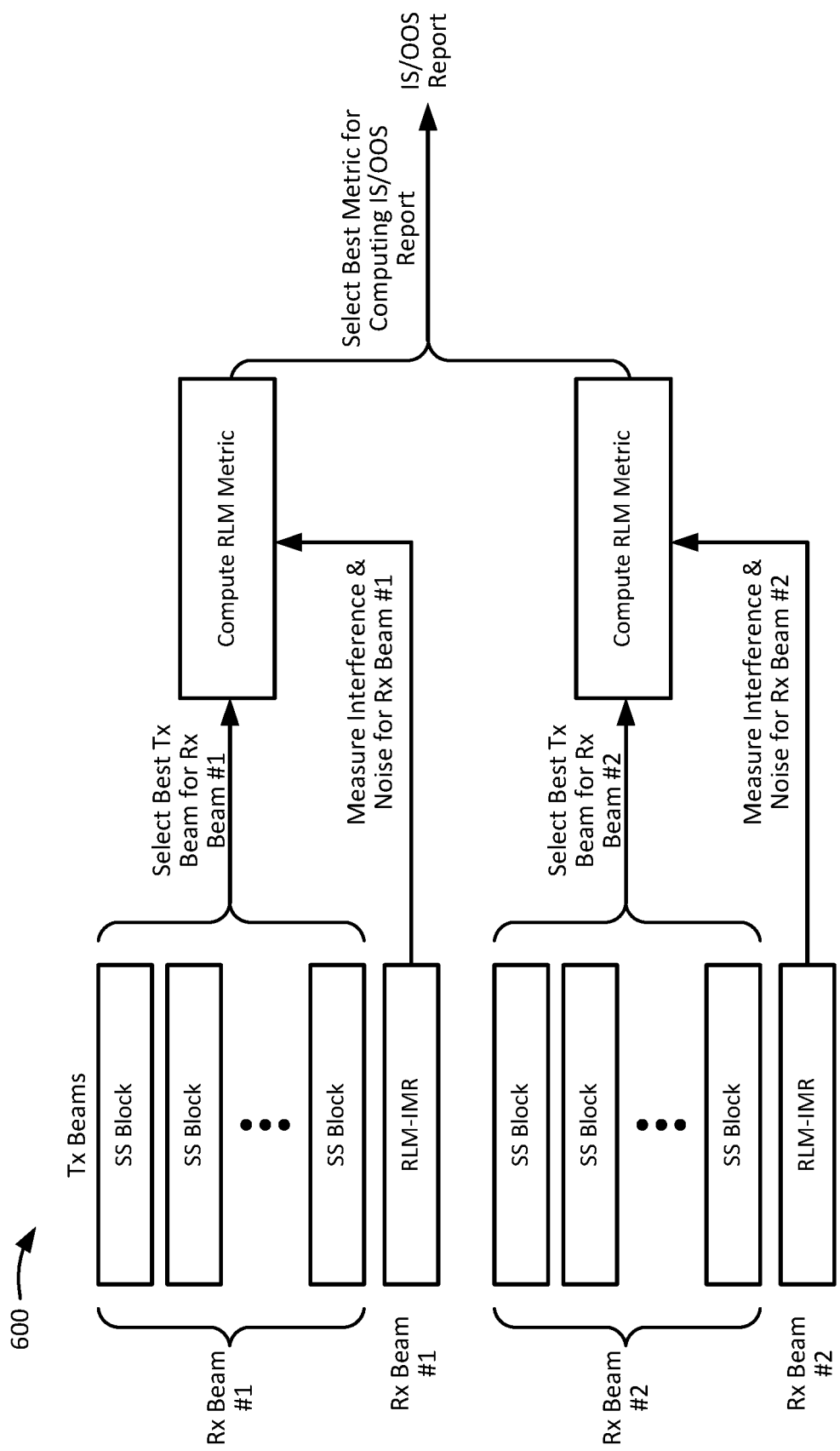

FIGS. 5 and 6 are block diagrams of examples 500 and 600 for generating IS/OOS reports for multiple BPLs. In some embodiments, UE 101 may be configured with multiple BPLs. In such scenarios, UE 101 may perform monitoring and measuring procedures for multiple Rx beams. For example, if UE 101 is configured with two BPLs, and Rx beam #1 and Rx beam #2 are the Rx beams associated with the configured BPLs, UE 101 may measure link quality from both Rx beams. As shown in FIG. 5, in some embodiments, UE 101 may generate a IS/OOS report per Rx beam, treating each Rx beam as a separate link that UE 101 may monitor and maintain. As shown in FIG. 6, in other embodiments, UE 101 may generate a single IS/OOS report that addresses multiple (e.g., all) Rx beams. This may be done by computing the RLM metric for each Rx beam and selecting the best RLM metric among all metrics to be used for determining IS or OOS. In some embodiments, the SS blocks shown in FIGS. 5 and 6 may be replaced by channel state information reference signal (CSI-RS) information.

Figure 7:
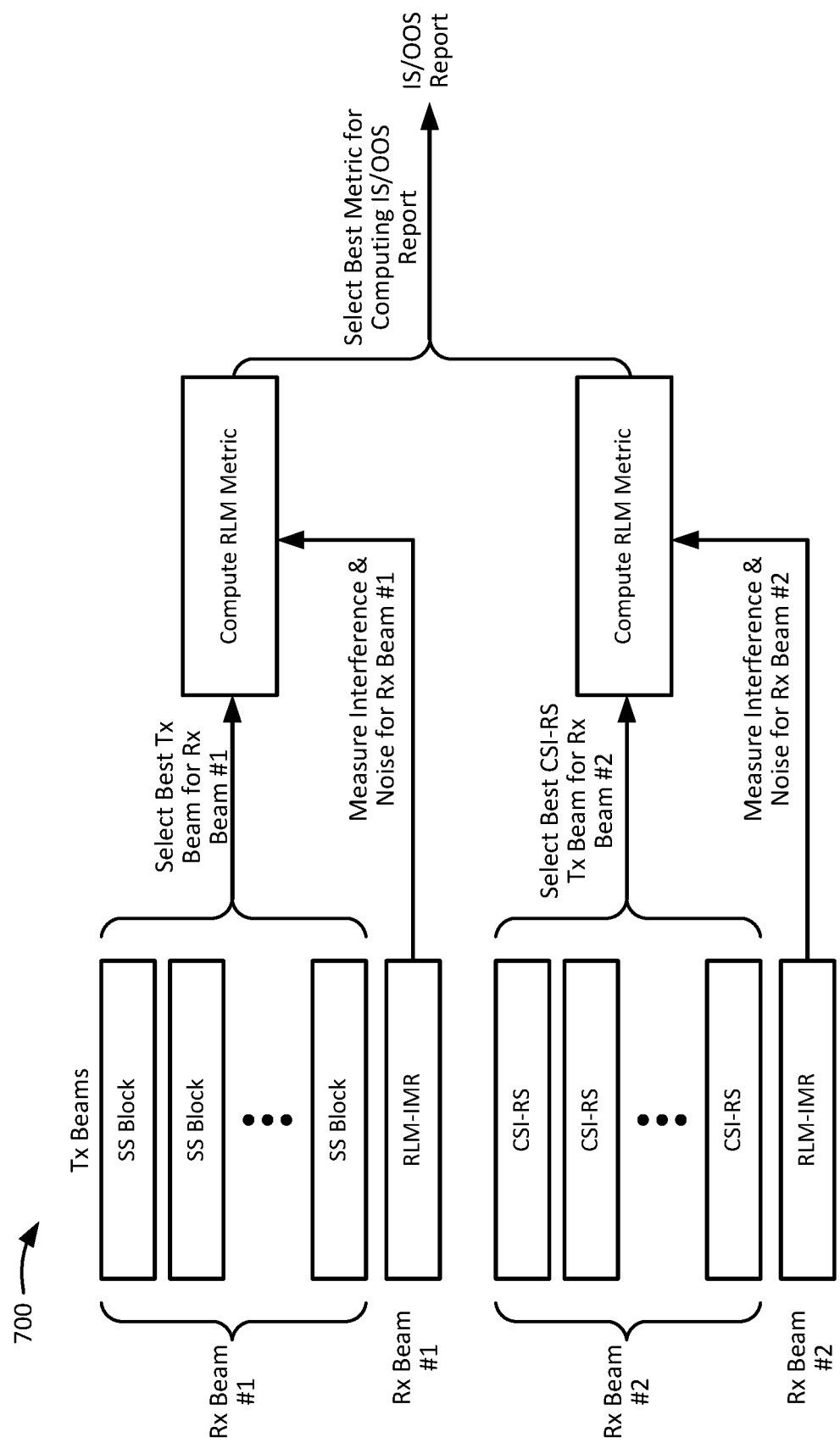

FIG. 7 is a block diagram of an example of monitoring SS blocks and CSI-RSs for RLM. As shown, UE 101 may be configured with multiple RLM-RSs. In such scenarios, the RLM metric may be computed for each set of RLM-RS procedure. For example, a configured set of RLM-RS may be SS blocks and CSI-RS instances. For each RLM-RS instance, UE 101 may monitor the RLM-RS with different, or the same, Rx beams. This may depend on a quasi-co-location (QCL) property relationship between SS blocks and CSI-RS instances. If the two RSs have a spatial QCL property relationship between them, the same or similar Rx beams may be used to receive both RSs. If not, the two RSs may be monitored with different Rx beams. When UE 101 is configured to monitor both RLM-RSs, UE 101 may compute a RLM metric for each set of RLM-RSs. Finally, UE 101 may select the RLM metric that results in the highest value (e.g., best link quality) and use the selected RLM metric to determine IS/OOS conditions. Although figures may include two BPLs (or two RLM-RSs) the techniques described herein are equally applicable to scenarios involving more than two BPLs or RLM-RSs.

Figure 8:
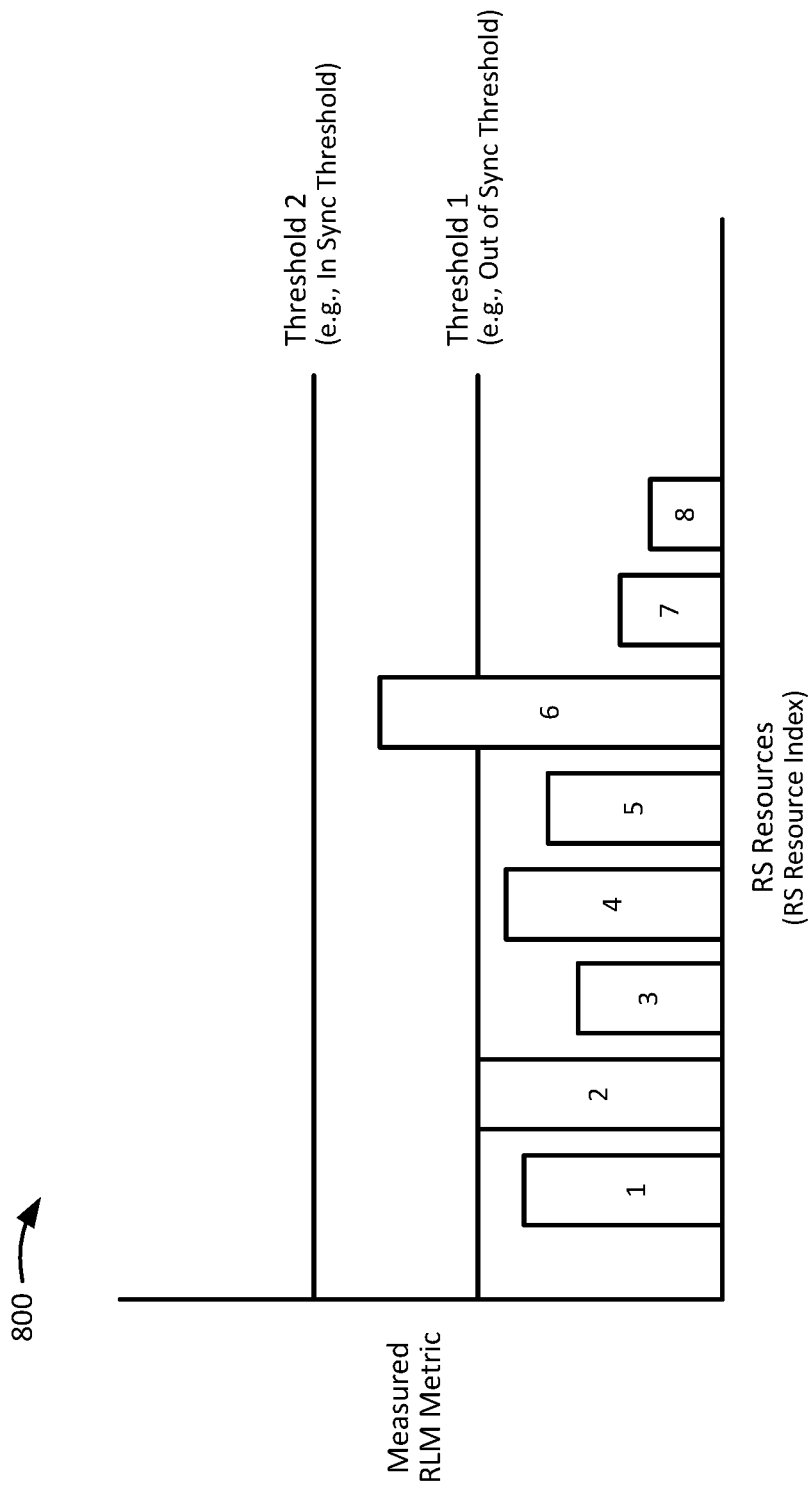
FIG. 8 is an example of RS resources that may be measured for RLM purposes.

FIG. 8 is an example 800 of RS resources that may be measured for RLM purposes. As described herein, UE 101 may have access to multiple RS resources (e.g., RS resources 1-8). UE 101 may be configured to determine which RS resource corresponds to the best link quality (e.g., RS resource 6). UE 101 may be configured to determine a RLM metric for the RS resource of the best link quality. UE 101 may compare the RLM metric to one or more thresholds (e.g., Threshold 1, Threshold 2, etc.). Examples of such thresholds may include a in sync (IS) threshold and an out-of-sync (OOS) threshold. When the RS resource of the best link quality is below a threshold (e.g., RS resource 6 with respect to Threshold 2) UE 101 may determine, therefore, that the RLM metrics for all other RS resources are also below the threshold. By contrast, when the RS resource (e.g., RS resource 6 with respect to Threshold 1) of the best link quality is above a threshold, UE 101 may determine that at least one RLM metric will be above the threshold. UE 101 may use the RLM metric that corresponds to the best RAN node 111 link quality, among all RLM metrics for each Rx beam, to determine and report the IS/OOS condition.

Additional techniques, described herein, may be used to enhance, and/or related to, channel access (CA), uplink control information (UCI) mapping, additional starting/ending positions, and transport block size (TBS) regarding UL partial subframe transmissions in a licensed assisted access (LAA) and/or enhanced LAA (eLAA) scenario. LAA and enhanced LAA (eLAA) may enable a LTE and/or NR system (e.g., UE 101) to operate in an unlicensed band. LAA may combine an LTE and/or NR carrier in the unlicensed spectrum with an LTE and/or NR carrier in the licensed spectrum using a technique referred to as carrier aggregation. LAA may use frame structure type 3 (FS3) where each radio frame may be 10 ms and consists of 10 subframes at 1 ms each. Any of these 10 subframes can be used for uplink (UL) or downlink (DL) transmissions or neither in which case the subframe may be empty. LAA transmission can start and end at any subframe and can consist of one or more consecutive subframes. FS3 may include partial subframes that may cater to listen before talk (LBT) protocol, whereby radio transmitters first sense the medium (e.g., a carrier) and transmit only if the medium is sensed to be idle.

LAA may use partial subframes. For example, in a LAA UL transmission, the 0th symbol in the first subframe of a LAA UL transmission can be partially filled, completely filled, or completely empty. Additionally, the last subframe in an LAA UL transmission can be completely filled with 14 Orthogonal Frequency Division Multiplexing (OFDM) symbols or can be partially filled with only 13 OFDM symbols.

Techniques, described herein, may provide multiple starting and ending positions in a subframe for UL and DL transmission using FS3. In some embodiments, RAN node 111 may determine a subframe format that UE 101 may use to communicate in the UL direction. For example, RAN node 111 may determine a number of symbols of the subframe that are to be used by UE for UL communications. When RAN node 111 determines that UE 101 is to use only a portion of the symbols in the subframes, the subframe may be referred to as a partial subframe. Additionally, RAN node 111 may determine a start portion or point within the subframe and/or an end portion or point within the subframe. As described herein, a start point may include a first symbol, or portion thereof, that UE 101 may use for UL transmission. By contrast, an end point may include a last symbol, or portion thereof, that UE 101 may use for UL transmission. As RAN node 111 may designated any one of many locations as a start point, any one of many locations as an end point, within a subframe, the symbol length of a partial subframe may vary depending on the embodiments (e.g., a symbol length of 1, 3, 4, 6, 7, 10, 11, etc.).

RAN node 111 may transmit information (e.g., DCI, which may include a particular DCI format) describing the subframe format to UE 101. In some embodiments, UE 101 may be in one or more modes of operation. Mode 1 may include a scenario in which UE 101 is performing a procedure relating to PUSCH transmission procedure, such as a LBT procedure. In Mode 1, UE 101 may operate under the assumption that the entire subframe (e.g., all symbols in the subframe) are to be used. As such, UE 101 may start with a first symbol of the subframe when performing the LBT procedure and may inform RAN node 111 upon completion of the LBT procedure. In such a scenario, as UE 101 may no longer be performing a procedure using the subframe, RAN node 111 may transmit, to UE 101, DCI that includes instructions for using a partial subframe, and UE 101 may implement the instructions, which may include using the subframe in accordance with a start point and stop point indicated by RAN node 111. In some embodiments, a first part of a partial subframe may include a portion of the subframe that has been missed, already used (e.g., for LBT), or is otherwise unavailable to UE 101. In such a scenario, UE 101 may be configured to use the first part of the partial subframe in a different part of the subframe (e.g., after the end point of the current partial subframe but before the start point of the next partial subframe).

In some embodiments, RAN node 111 may provide UE 101 with DCI, which may include instructions for UE 101 to use partial subframes. In some embodiments, this may prevent UE 101 from completing the LBT procedure by causing UE 101 to implement the instructions to communicate using a partial subframe. In some embodiments, the DCI (and/or DCI format) may indicate a new start point between symbols 7 and 8. Additionally, or alternatively, when UE 101 is unable to complete a LBT procedure, UE 101 may be configured to again perform (or attempt to perform) the LBT procedure prior (e.g., immediately prior) to the start point of the next subframe.

In some embodiments, prior to providing UE 101 with DCI indicating a partial subframe structure for UE 101 to use, RAN node 111 may cause UE 101 to enter a mode of operation that may be referred to as Mode 2. Causing UE 101 to enter Mode 2, may inform the UE 101 that partial subframes are to be used to communicate in the UL direction. As such, UE 101 may not assume that entire subframes are to be used to communicate with RAN node 111, and therefore, UE 101 may refrain from performing certain PUSCH transmissions (e.g., a LBT procedure) that might later be interrupted by instruction to use partial subframes to communicate with RAN node 111.

RAN node 111 may determine the characteristics of the partial subframe (e.g., a start point, an endpoint, etc.) that UE 101 is to use to communicate with RAN node 111. In some embodiments, RAN node may also determine whether to trigger UCI multiplexing, which may include RAN node 111 determining that a single slot can provide sufficient capacity, such that UE 101 may transmit UCI in the partial subframe as well. As described herein, a partial subframe may include a variety of different start points and/or end points, such that the symbol length of partial subframe may vary. In addition, the examples and embodiments, described below, may include the use of techniques, such as TBS, rate matching, etc., to better enable UE 101 and/or RAN node 111 to communicate using partial subframes.

Additionally, a UL partial subframe transmission may be configured with a starting point at symbol 7 (instead of, for example, symbol 0 or symbol 1). As such, LBT protocol may be implemented by UE 101 and/or RAN node 111 with a starting point of symbol 7 (e.g., for a LAA UL transmission). In a Mode 1 scenario, when a UL transmission starts at symbol 7, the first slot of the subframe maybe punctured and TBS may be determined as for the full subframe, regardless of the starting point (i.e., no TBS scaling). By contrast, in a Mode 2 scenario (e.g., a transmit diversity scenario) a UL grant may indicate the starting position of #7, TBs may be rate matched into the second slot, and TBS scaling may be used. Additionally, in some embodiments, a UL transmission may end at (or in) symbol #6. The ending position may be indicated with a corresponding UL grant, TBs may be rate matched into the allocated symbols, and TBS scaling may be used.

Figure 9:
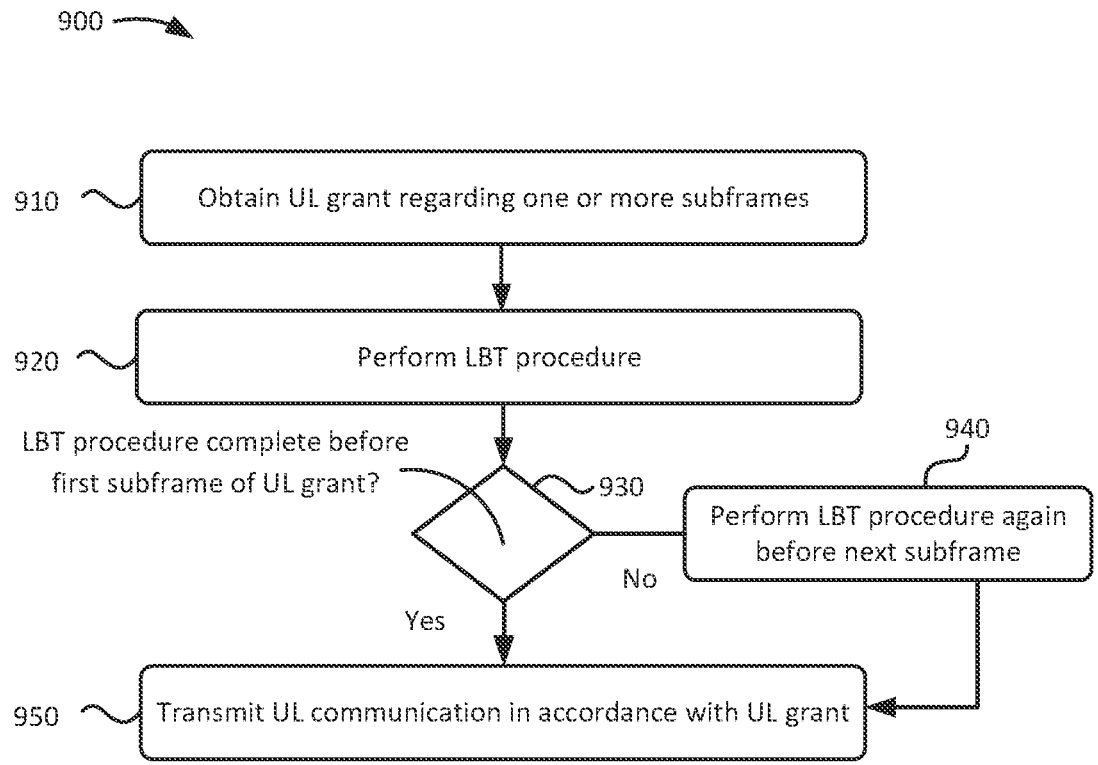
FIG. 9 is a flowchart diagram of an example process for performing a listen before talk (LBT) procedure.

FIG. 9 is a flowchart diagram of an example process 900 for performing a LBT procedure. Process 900 may be implemented by UE 101. In some embodiments, one or more of the operations described in FIG. 9 may be performed in whole, or in part, by another device, such as one or more of the devices described above with reference to FIG. 1. Additionally, the example of FIG. 9 is provided as a non-limiting example. In practice, the example of FIG. 9 may include fewer, additional, and/or alternative, operations and/or functions.

As shown, process 900 may include obtaining a UL grant regarding one or more subframes (block 910). For example, UE 101 may communicate with RAN node 111 to obtain a UL grant for transmitting information to the network. In some embodiments, the UL grant may be an allocation of radio resources to UE 101, which may include one or more consecutive subframes. The UL grant may enable UE 101 to transmit information to RAN node 111 in the UL direction.

Process 900 may also include performing a LBT procedure (block 920). For example, UE 101 may be configured to perform a LBT procedure, which may include a 25 µs, single interval LBT procedure. In some scenarios, UE 101 may be able to complete the LBT procedure before the first scheduled subframe of the UL grant (block 930—Yes). As such, UE 101 may proceed to use the allotted subframes to transmit a UL communication in accordance with the UL grant (block 950). In other scenarios, UE 101 may not have enough time to complete the LBT procedure before the first scheduled subframe of the UL grant (block 930—No). In such a scenario, UE 101 may be configured to perform 25 µs single interval LBT again right before the start of the next subframe (block 940). Upon completing the LBT procedure, UE 101 may proceed to use the allotted subframes to transmit a UL communication in accordance with the UL grant (block 950).

When UL control information (UCI) is multiplexed with a UL shared channel (UL-SCH) of a physical uplink shared channel (PUSCH) the channel quality indicator (CQI)/pre-coding matrix indicator (PMI), hybrid automatic repeat request (HARQ)-acknowledge (ACK), and rank indicator (RI) may be separately modulated and multiplexed in a channel interleaver before the discrete Fourier transform (DFT) to preserve the low channel master (CM) property. HARQ-ACK feedback may be placed in the two symbols next to the demodulation reference signal (DMRS) symbol (e.g., symbols 2 and 4) in each slot to benefit from accurate channel estimation. The encoded UL-SCH data in the PUSCH may be punctured to make a room for HARQ-ACK feedback encoded bits and the HARQ-ACK is frequency first mapped. RI encoded bits may be placed in the symbols for the placement of HARQ-ACK feedback (e.g., symbols 1 and 5, in each slot regardless of actual presence of HARQ-ACK feedback. The UL-SCH data may be rate mated in the PUSCH and the RI is frequency first mapped. The CQI/PMI may be placed before the UL-SCH data when multiplexed and mapped in a time first manner.

In the case of UL starting a partial subframe, puncturing may be used for the first slot. Note that UE 101 may prepare the PUSCH assuming a full subframe transmission. The UCI may be multiplexed with the UL-SCH before the DFT. After the UE realizes that it may transmit a partial subframe, there may not be much time allowed for the UE to do anything else. That's the rationale behind the choice of PUSCH puncturing option for partial UL subframe transmission for Mode 1. Therefore, after puncturing the first slot, there may be no other option than the UE transmits the second slot of the PUSCH as it was originally prepared, including the UCI. It may be a different question whether RAN node 111 may utilize the received UCI in the second slot or not. If the code rate of CQI/PMI, which uses the same modulation and coding scheme (MCS) as UL-SCH in the same PUSCH, the CQI/PMI may be recovered as CQI/PMI is also time-first mapped. In the case of 1-bit HARQ-ACK or RI, the information may be retrieved due to the repetition code. However, in the case of 2-bit HARQ-ACK or RI, the retrieval may be difficult with the simplex code.

One form of UL transmission may include UE 101 transmitting UCI that is multiplexed with an UL-SCH of a PUSCH. A channel quality indicator (CQI)/pre-coding matrix indicator (PMI), hybrid automatic repeat request (HARQ)-acknowledge (ACK), and/or rank indicator (RI) may be separately modulated and multiplexed in a channel interleaver, before performing discrete Fourier transform (DFT), to preserve a low channel master (CM) property. In some embodiments, HARQ-ACK feedback may be placed in two symbols next to a demodulation reference signal (DMRS) symbol (i.e., symbols 2 and 4) in each slot to, for example, benefit from accurate channel estimation. Encoded UL-SCH data in the PUSCH may be punctured to make room for HARQ-ACK feedback encoded bits and the HARQ-ACK is frequency first mapped. RI encoded bits may be placed in the symbols to the symbols (e.g., symbols 1 and 5) for the placement of HARQ-ACK feedback in each slot regardless of the presence of HARQ-ACK feedback. The UL-SCH data may be rate matched in the PUSCH, and the RI may be frequency first mapped. The CQI/PMI may be placed before the UL-SCH data when multiplexed and mapped in a time first manner.

UE 101 may use a UL transmission where a starting partial subframe is punctured in the first slot. In some embodiments, UE 101 may initially prepare a transmission for the PUSCH under the assumption that it is to be a full-subframe transmission (e.g., that the transmission will not include partial subframes) and UCI may be multiplexed with the UL-SCH prior to DFT. However, by the time UE 101 is aware that it may transmit a partial subframe, there may not be much time allowed for UE 101 to do anything else if/when UE 101 implemented puncturing on the first slot. In other words, after puncturing the first slot, there may be no other option than for UE 101 to transmit the second slot of the PUSCH as it was originally prepared (e.g., as a full-subframe including the UCI).

In some embodiments, if/when the code rate of CQI/PMI, which may use the same modulation and coding scheme (MCS) as the UL-SCH of the same PUSCH, the CQI/PMI may be recovered as CQI/PMI may also be time-first mapped. In scenarios where a 1-bit HARQ-ACK or RI is implemented, the information may be retrieved due to the repetition code. By contrast, in scenarios involving a s2-bit HARQ-ACK or RI, the retrieval may be difficult with the simplex code.

Additionally, or alternatively, partial subframe transmissions where a device is operating in Mode 2 (e.g., a transmit diversity scenario). For example, in some embodiments, a scheduled partial starting subframe transmission may include an additional starting position between designated symbols (e.g., between symbols 7 and 8). In such scenarios, RAN node 111 may create, designate, configure, etc., a LBT gap before a start of the partial starting subframe transmission. In some embodiments, this may involve one more DCI formats (e.g., a DCI format for eLAA and/or cyclic prefix (CP) extensions. In some embodiments, rate matching may be used to help ensure proper transmission and/or reception of a partial subframe with additional starting positions.

Additionally, or alternatively, an MCS table may be used in scenarios involving partial subframe transmissions. RAN node 111 may not know whether a LBT procedure performed by UE 101 is to be successful or not a priori. As such, if/when RAN node 111 schedules UE 101 to use a MCS table to, for example, lower the code rate, UE 101 might have been able to successfully complete the LBT procedure anyway, in which case the code rate may have been lowered unnecessarily. On the other hand, even if the MCS table is used and, thereby, it may be more likely that RAN node 111 may fail in decoding the partial subframe, the reception of partial subframe may help in decoding the retransmissions with soft combining.

Additionally, or alternatively, RAN node 111 may determine whether to trigger, enable, etc., UCI multiplexing when a partial UL subframe is scheduled. For example, RAN node 111 may trigger UCI multiplexing if/when RAN node 111 determines that a single slot may provide adequate capacity for transmitting the UCI in a partial UL subframe.

In addition, a partial subframe may have various subframe lengths. For example, a partial UL subframe may have an ending at the end of symbol #3 and/or symbol #10, which mat be in addition to the already agreed upon symbol #6 and the already supported symbols #12 and #13. Since a partial UL subframe, with rate matching, may be scheduled by RAN node 111, there may be no additional burden for introducing additional starting positions. Therefore, partial UL subframes with an end at, for example, the end of the symbol #3 and/or symbol #10 may be readily implemented.

Figure 10:
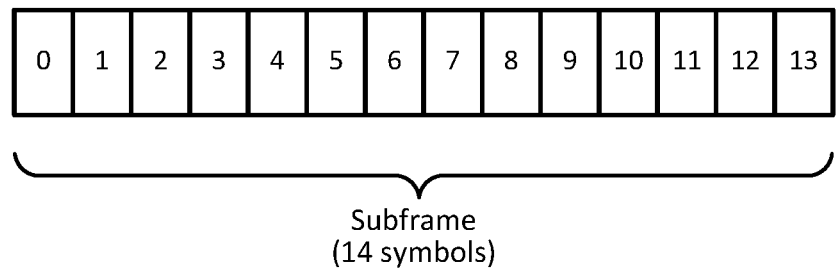
FIG. 10 is a diagram of example subframes
Figure 10:

FIG. 10 is a diagram of example subframes 1000 and 1050. Referring to example subframe 1000, a device (e.g., UE 101) operating in accordance with Mode 1 may engage in UCI mapping with the assumption that the entire subframe is to be used for UL transmission. In other words, under such conditions, UE 101 may operate under the assumption that the subframe is not to be used as a partial subframe.

Referring to example subframe 1050, by contrast, a device (e.g., UE 101) operating in accordance with Mode 2 may implement UCI multiplexing and mapping that assumes the second slot only. Additionally, as shown, subframe 1050 may include an additional starting position X between symbols 7 and 8. In some embodiments, starting position X may begin at, or around, 25 µs after the start of symbol 7. In some embodiments, starting position X may begin at, or around, 25 µs plus a timing advance (TA) after the start of symbol 7. Additionally, as shown, starting position X may extend into a portion of symbol 8.

Figure 11:
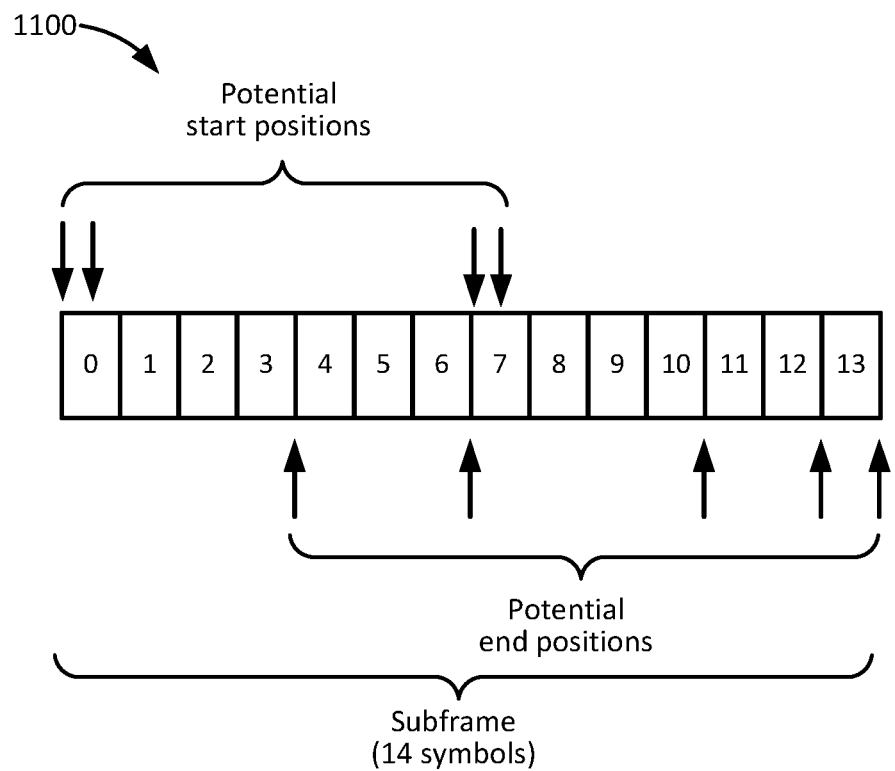
FIG. 11 is a diagram of an example subframe that includes multiple start and end positions

FIG. 11 is a diagram of an example subframe 1100 that includes multiple start and end positions. As shown, subframe 1100 may include potential start positions at the beginning of symbol 0, during symbol 0, at the beginning of symbol 7, and/or during symbol 7 (as descried above with reference to FIG. 7). Subframe 1100 may also include potential end positions at one or more of the end of symbols 3, 6, 10, 12, and 13. Which start and/or end positions are implemented in a given scenario may depend on one or more of a variety of factors, such as . . . . Additionally, a length of a partial subframe may depend on which start position and corresponding end position are used. For example, a partial subframe transmission starting from symbol 7 and ending at symbol 12 may be 6 symbols in length. If the partial subframe transmission where to end at symbol 13, then the partial subframe may be 7 symbols in length. In some embodiments, partial subframes of a given length (e.g., 6 symbols in length) may include different combinations of start and end positions. Additionally, or alternatively, different start and stop positions may be used for partial subframes of distinct symbol lengths (e.g., symbol lengths of 1, 3, 4, 6, 7, 10, 11, etc.).

Figure 12:
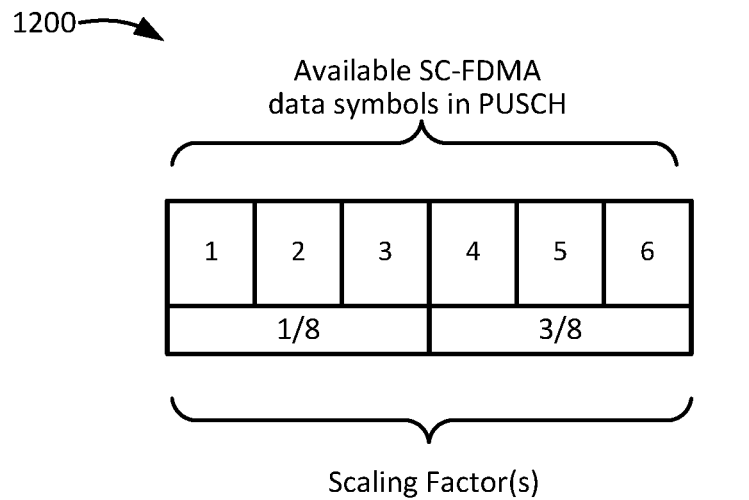
FIG. 12 is a diagram of examples of physical resource block (PRB) scaling factors that may be applied to single carrier frequency division multiple access (SC-FDMA) data symbols in a a physical uplink shared channel (PUSCH)
Figure 12:
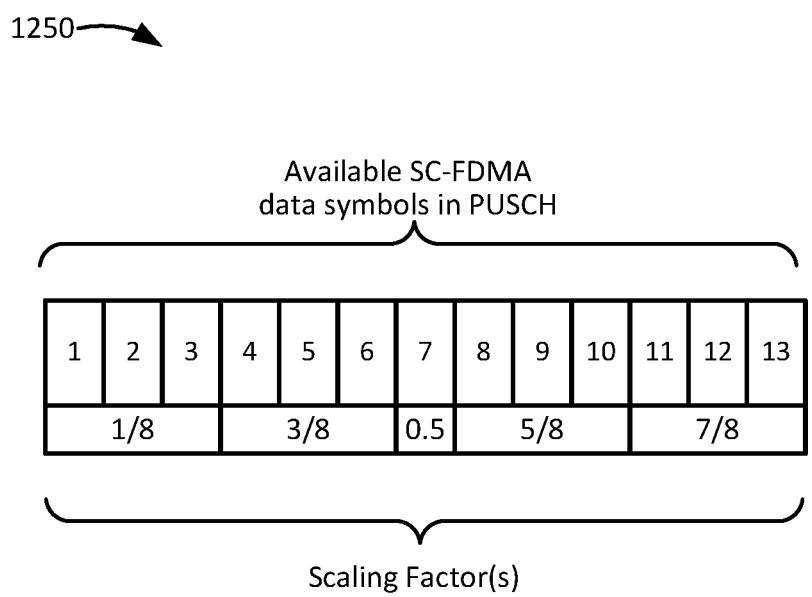

FIG. 12 is a diagram of examples 1200 and 1250 of PRB scaling factors that may be applied to SC-FDMA data symbols in a PUSCH. The examples of FIG. 12 may pertain to rate matching for UL starting partial subframes (e.g., Mode 2) and/or UL ending partial subframes. As shown, example 1200 may include 6 available SC-FDMA data symbols (numbered 1-6) in a PUSCH. Symbols 1-3 may correspond to one scaling factor (e.g., ⅛) while the remaining symbols (4-6) may correspond to another scaling factor (e.g., ⅜). While example 1200 is depicted as having 6 symbols, in some embodiments, example 1200 may correspond to a subframe with 6 symbol duration downlink and uplink pilot timeslots (DwPTS), 2 symbol duration guard time (GT), and 6 symbol duration uplink pilot time slot (UpPTS). For normal cyclic prefixes (NCPs), the number of data symbols for a PUSCH in UpPTS may be 2, 3, 4, 5, or 6 symbols.

As shown, example 1250 may include 13 available SC-FDMA data symbols (numbered 1-13) in a PUSCH. As described above with reference to FIG. 11, various combinations of start positions and end positions may be applied to the symbols of example 1250, and thereby determine a symbol length of the resulting partial subframe (e.g., 1, 3, 4, 5, 6, 7, 10, or 11 symbols long)s. In some embodiments, a TBS scaling factor may be applied to a partial subframe based on the symbol length of the partial subframe. For example, as shown in example 1250, a TBS scaling factor of ⅛ may correspond to a 1 to 3 symbol length PUSCH transmission, a TBS scaling factor of ⅜ may correspond to a 4 to 6 symbol length PUSCH transmission. A TBS scaling factor of 0.5 may pertain to a one slot (e.g., slot 7) PUSCH transmission, a TBS scaling factor of ⅝ may pertain to an 8 to 10 symbol length PUSCH transmission, and a TBS scaling factor of ⅞ may be applied to a 11-13 symbol length PUSCH transmission. The quantity, arrangement, and/or characteristics of the symbols and/or TBS scaling factors depicted in FIG. 12 are provided as a non-limiting example. In practice, the techniques described herein may include fewer, additional, and/or alternative symbols and/or TBS scaling factors than what is show in FIG. 12.

Figure 13:
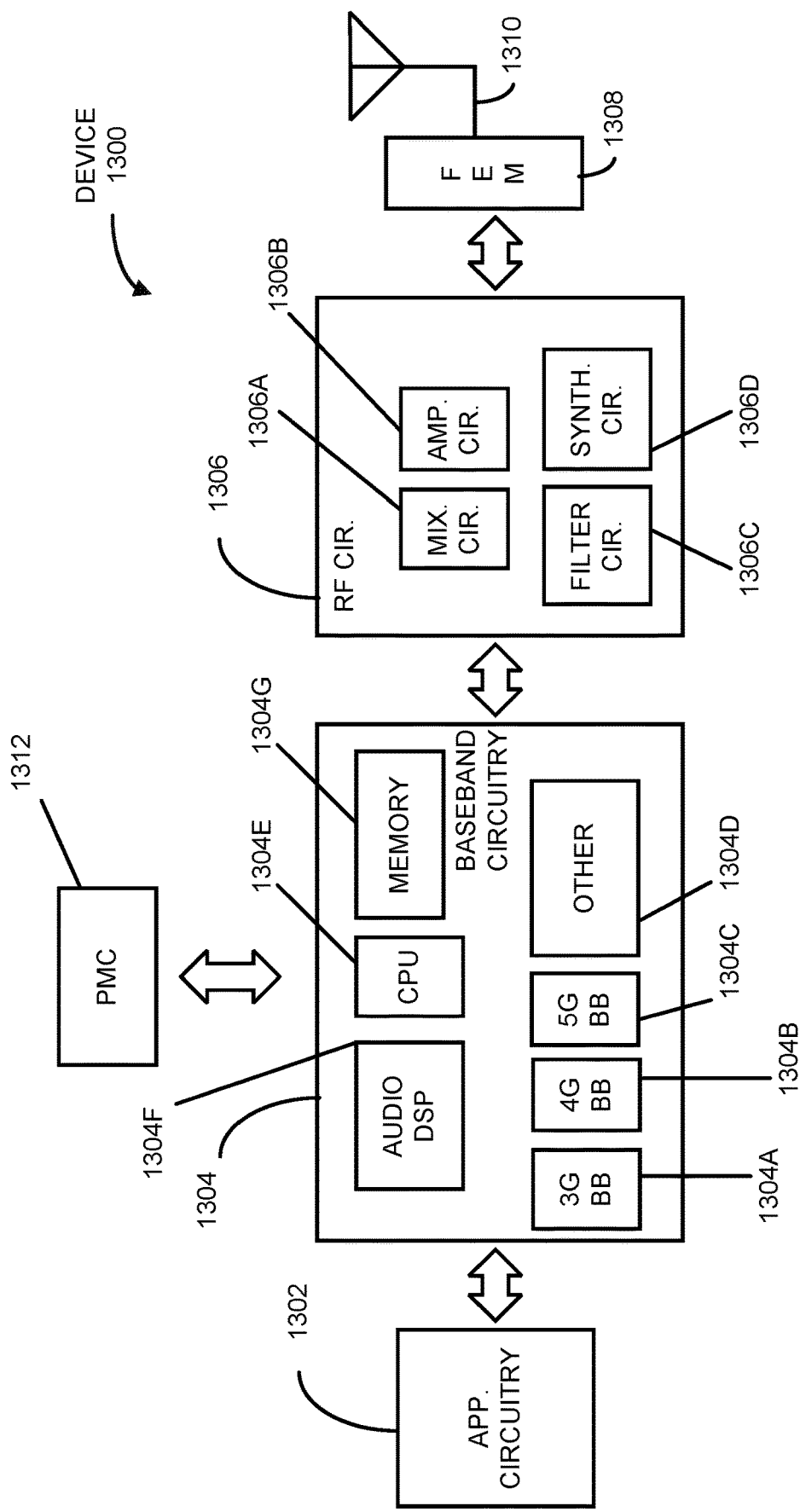
FIG. 13 is a block diagram of example components of a device in accordance with some embodiments.

FIG. 13 illustrates example components of a device 1300 in accordance with some embodiments. In some embodiments, the device 1300 may include application circuitry 1302, baseband circuitry 1304, Radio Frequency (RF) circuitry 1306, front-end module (FEM) circuitry 1308, one or more antennas 1310, and power management circuitry (PMC) 1312 coupled together at least as shown. The components of the illustrated device 1300 may be included in a UE or a RAN node. In some embodiments, the device 1300 may include less elements (e.g., a RAN node may not utilize application circuitry 1302, and instead include a processor/controller to process IP data received from an EPC). In some embodiments, the device 1300 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1302 may include one or more application processors. For example, the application circuitry 1302 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1300. In some embodiments, processors of application circuitry 1302 may process IP data packets received from an EPC.

The baseband circuitry 1304 may include circuitry such as, but not limited to, one or more single-core or multi-core processors. The baseband circuitry 1304 may include one or more baseband processors or control logic to process baseband signals received from a receive signal path of the RF circuitry 1306 and to generate baseband signals for a transmit signal path of the RF circuitry 1306. Baseband processing circuitry 1304 may interface with the application circuitry 1302 for generation and processing of the baseband signals and for controlling operations of the RF circuitry 1306. For example, in some embodiments, the baseband circuitry 1304 may include a third generation (3G) baseband processor 1304A, a fourth generation (4G) baseband processor 1304B, a fifth generation (5G) baseband processor 1304C, or other baseband processor(s) 1304D for other existing generations, generations in development or to be developed in the future (e.g., second generation (2G), sixth generation (6G), etc.). The baseband circuitry 1304 (e.g., one or more of baseband processors 1304A-D) may handle various radio control functions that enable communication with one or more radio networks via the RF circuitry 1306. In other embodiments, some or all of the functionality of baseband processors 1304A-D may be included in modules stored in the memory 1304G and executed via a Central Processing Unit (CPU) 1304E. The radio control functions may include, but are not limited to, signal modulation/demodulation, encoding/decoding, radio frequency shifting, etc. In some embodiments, modulation/demodulation circuitry of the baseband circuitry 1304 may include Fast-Fourier Transform (1-1-T), precoding, or constellation mapping/demapping functionality. In some embodiments, encoding/decoding circuitry of the baseband circuitry 1304 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1304 may include one or more audio digital signal processor(s) (DSP) 1304F. The audio DSP(s) 1304F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1304 and the application circuitry 1302 may be implemented together such as, for example, on a system on a chip (SOC).

In some embodiments, the baseband circuitry 1304 may provide for communication compatible with one or more radio technologies. For example, in some embodiments, the baseband circuitry 1304 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 1304 is configured to support radio communications of more than one wireless protocol may be referred to as multi-mode baseband circuitry.

RF circuitry 1306 may enable communication with wireless networks using modulated electromagnetic radiation through a non-solid medium. In various embodiments, the RF circuitry 1306 may include switches, filters, amplifiers, etc. to facilitate the communication with the wireless network. RF circuitry 1306 may include a receive signal path which may include circuitry to down-convert RF signals received from the FEM circuitry 1308 and provide baseband signals to the baseband circuitry 1304. RF circuitry 1306 may also include a transmit signal path which may include circuitry to up-convert baseband signals provided by the baseband circuitry 1304 and provide RF output signals to the FEM circuitry 1308 for transmission.

In some embodiments, the receive signal path of the RF circuitry 1306 may include mixer circuitry 1306a, amplifier circuitry 1306b and filter circuitry 1306c. In some embodiments, the transmit signal path of the RF circuitry 1306 may include filter circuitry 1306c and mixer circuitry 1306a. RF circuitry 1306 may also include synthesizer circuitry 1306d for synthesizing a frequency for use by the mixer circuitry 1306a of the receive signal path and the transmit signal path. In some embodiments, the mixer circuitry 1306a of the receive signal path may be configured to down-convert RF signals received from the FEM circuitry 1308 based on the synthesized frequency provided by synthesizer circuitry 1306d. The amplifier circuitry 1306b may be configured to amplify the down-converted signals and the filter circuitry 1306c may be a low-pass filter (LPF) or band-pass filter (BPF) configured to remove unwanted signals from the down-converted signals to generate output baseband signals. Output baseband signals may be provided to the baseband circuitry 1304 for further processing. In some embodiments, the output baseband signals may be zero-frequency baseband signals, although this is not a requirement. In some embodiments, mixer circuitry 1306a of the receive signal path may comprise passive mixers, although the scope of the embodiments is not limited in this respect.

In some embodiments, the mixer circuitry 1306a of the transmit signal path may be configured to up-convert input baseband signals based on the synthesized frequency provided by the synthesizer circuitry 1306d to generate RF output signals for the FEM circuitry 1308. The baseband signals may be provided by the baseband circuitry 1304 and may be filtered by filter circuitry 1306c.

In some embodiments, the mixer circuitry 1306a of the receive signal path and the mixer circuitry 1306a of the transmit signal path may include two or more mixers and may be arranged for quadrature downconversion and upconversion, respectively. In some embodiments, the mixer circuitry 1306a of the receive signal path and the mixer circuitry 1306a of the transmit signal path may include two or more mixers and may be arranged for image rejection (e.g., Hartley image rejection). In some embodiments, the mixer circuitry 1306a of the receive signal path and the mixer circuitry 1306a may be arranged for direct downconversion and direct upconversion, respectively. In some embodiments, the mixer circuitry 1306a of the receive signal path and the mixer circuitry 1306a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1306 may include analog-to-digital converter (ADC) and digital-to-analog converter (DAC) circuitry and the baseband circuitry 1304 may include a digital baseband interface to communicate with the RF circuitry 1306.

In some dual-mode embodiments, a separate radio IC circuitry may be provided for processing signals for each spectrum, although the scope of the embodiments is not limited in this respect.

In some embodiments, the synthesizer circuitry 1306d may be a fractional-N synthesizer or a fractional N/N+1 synthesizer, although the scope of the embodiments is not limited in this respect as other types of frequency synthesizers may be suitable. For example, synthesizer circuitry 1306d may be a delta-sigma synthesizer, a frequency multiplier, or a synthesizer comprising a phase-locked loop with a frequency divider.

The synthesizer circuitry 1306d may be configured to synthesize an output frequency for use by the mixer circuitry 1306a of the RF circuitry 1306 based on a frequency input and a divider control input. In some embodiments, the synthesizer circuitry 1306d may be a fractional N/N+1 synthesizer.

In some embodiments, frequency input may be provided by a voltage controlled oscillator (VCO), although that is not a requirement. Divider control input may be provided by either the baseband circuitry 1304 or the applications processor 1302 depending on the desired output frequency. In some embodiments, a divider control input (e.g., N) may be determined from a look-up table based on a channel indicated by the applications processor 1302.

Synthesizer circuitry 1306d of the RF circuitry 1306 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1306d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1306 may include an IQ/polar converter.

FEM circuitry 1308 may include a receive signal path which may include circuitry configured to operate on RF signals received from one or more antennas 1310, amplify the received signals and provide the amplified versions of the received signals to the RF circuitry 1306 for further processing. FEM circuitry 1308 may also include a transmit signal path which may include circuitry configured to amplify signals for transmission provided by the RF circuitry 1306 for transmission by one or more of the one or more antennas 1310. In various embodiments, the amplification through the transmit or receive signal paths may be done solely in the RF circuitry 1306, solely in the FEM 1308, or in both the RF circuitry 1306 and the FEM 1308.

In some embodiments, the FEM circuitry 1308 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1306). The transmit signal path of the FEM circuitry 1308 may include a power amplifier (PA) to amplify input RF signals (e.g., provided by RF circuitry 1306), and one or more filters to generate RF signals for subsequent transmission (e.g., by one or more of the one or more antennas 1310).

In some embodiments, the PMC 1312 may manage power provided to the baseband circuitry 1304. In particular, the PMC 1312 may control power-source selection, voltage scaling, battery charging, or DC-to-DC conversion. The PMC 1312 may often be included when the device 1300 is capable of being powered by a battery, for example, when the device is included in a UE. The PMC 1312 may increase the power conversion efficiency while providing desirable implementation size and heat dissipation characteristics.

While FIG. 13 shows the PMC 1312 coupled only with the baseband circuitry 1304. However, in other embodiments, the PMC 1312 may be additionally or alternatively coupled with, and perform similar power management operations for, other components such as, but not limited to, application circuitry 1302, RF circuitry 1306, or FEM 1308.

In some embodiments, the PMC 1312 may control, or otherwise be part of, various power saving mechanisms of the device 1300. For example, if the device 1300 is in an RRC_Connected state, where it is still connected to the RAN node as it expects to receive traffic shortly, then it may enter a state known as Discontinuous Reception Mode (DRX) after a period of inactivity. During this state, the device 1300 may power down for brief intervals of time and thus save power.

If there is no data traffic activity for an extended period of time, then the device 1300 may transition off to an RRC_Idle state, where it disconnects from the network and does not perform operations such as channel quality feedback, handover, etc. The device 1300 goes into a very low power state and it performs paging where again it periodically wakes up to listen to the network and then powers down again. The device 1300 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1302 and processors of the baseband circuitry 1304 may be used to execute elements of one or more instances of a protocol stack. For example, processors of the baseband circuitry 1304, alone or in combination, may be used execute Layer 3, Layer 2, or Layer 1 functionality, while processors of the application circuitry 1304 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 14:
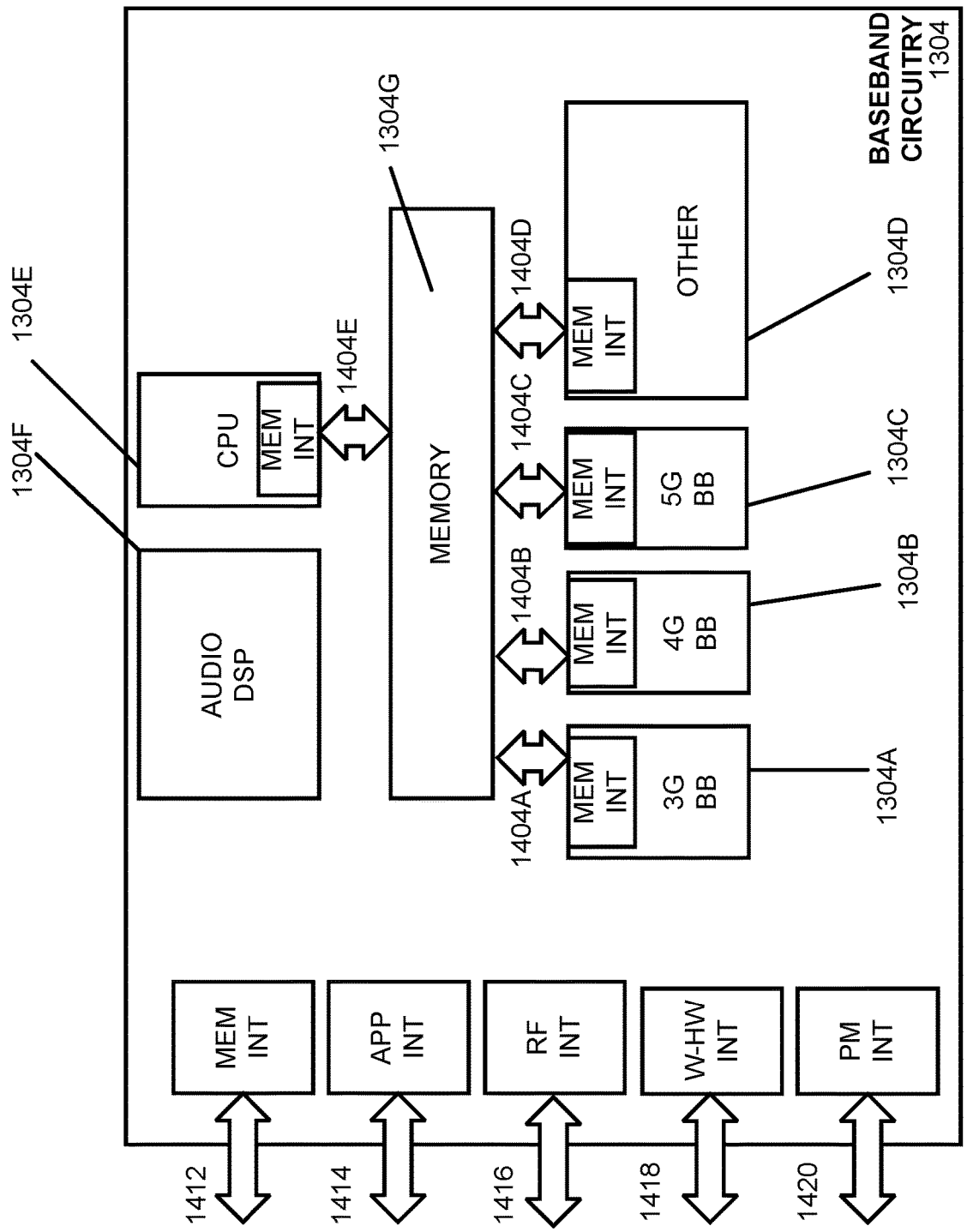
FIG. 14 is a block diagram of example interfaces of baseband circuitry in accordance with some embodiments.

FIG. 14 illustrates example interfaces of baseband circuitry in accordance with some embodiments. As discussed above, the baseband circuitry 1304 of FIG. 13 may comprise processors 1304A-1304E and a memory 1304G utilized by said processors. Each of the processors 1304A-1304E may include a memory interface, 1404A-1404E, respectively, to send/receive data to/from the memory 1304G.

The baseband circuitry 1304 may further include one or more interfaces to communicatively couple to other circuitries/devices, such as a memory interface 1412 (e.g., an interface to send/receive data to/from memory external to the baseband circuitry 1304), an application circuitry interface 1414 (e.g., an interface to send/receive data to/from the application circuitry 1302 of FIG. 13), an RF circuitry interface 1416 (e.g., an interface to send/receive data to/from RF circuitry 1306 of FIG. 13), a wireless hardware connectivity interface 1418 (e.g., an interface to send/receive data to/from Near Field Communication (NFC) components, Bluetooth® components (e.g., Bluetooth® Low Energy), Wi-Fi® components, and other communication components), and a power management interface 1420 (e.g., an interface to send/receive power or control signals to/from the PMC 1312.

Figure 15:
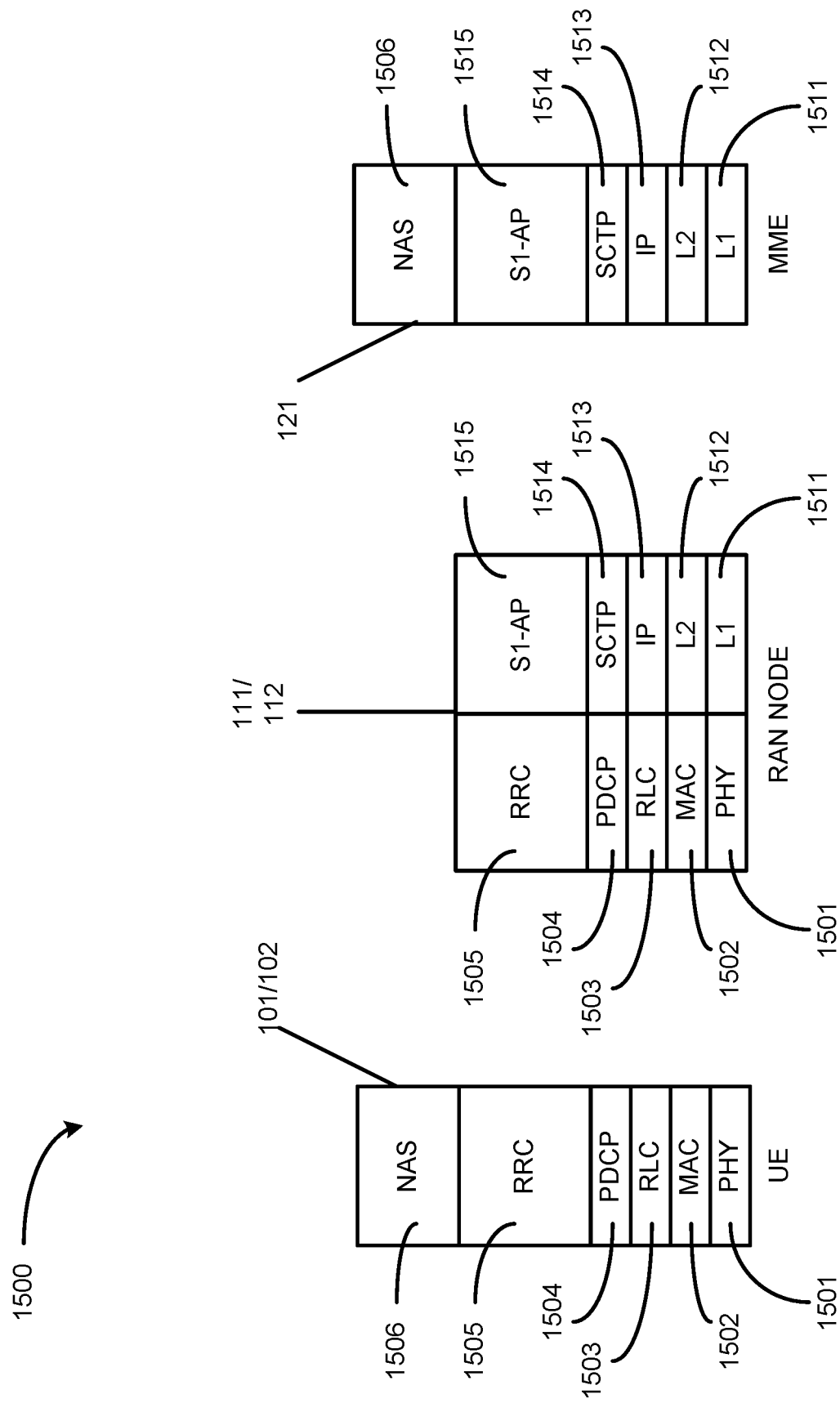
FIG. 15 is a block diagram of an example control plane protocol stack in accordance with some embodiments.

FIG. 15 is an illustration of a control plane protocol stack in accordance with some embodiments. In this embodiment, a control plane 1500 is shown as a communications protocol stack between the UE 101 (or alternatively, the UE 102), the RAN node 111 (or alternatively, the RAN node 112), and the MME 121.

The PHY layer 1501 may transmit or receive information used by the MAC layer 1502 over one or more air interfaces. The PHY layer 1501 may further perform link adaptation or adaptive modulation and coding (AMC), power control, cell search (e.g., for initial synchronization and handover purposes), and other measurements used by higher layers, such as the RRC layer 1505. The PHY layer 1501 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 1502 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 1503 may operate in a plurality of modes of operation, including: Transparent Mode (TM), Unacknowledged Mode (UM), and Acknowledged Mode (AM). The RLC layer 1503 may execute transfer of upper layer protocol data units (PDUs), error correction through automatic repeat request (ARQ) for AM data transfers, and concatenation, segmentation and reassembly of RLC SDUs for UM and AM data transfers. The RLC layer 1503 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 1504 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 1505 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 101 and the RAN node 111 may utilize a Uu interface (e.g., an LTE-Uu interface) to exchange control plane data via a protocol stack comprising the PHY layer 1501, the MAC layer 1502, the RLC layer 1503, the PDCP layer 1504, and the RRC layer 1505.

The non-access stratum (NAS) protocols 1506 form the highest stratum of the control plane between the UE 101 and the MME 121. The NAS protocols 1506 support the mobility of the UE 101 and the session management procedures to establish and maintain IP connectivity between the UE 101 and the P-GW 123.

The S1 Application Protocol (S1-AP) layer 1515 may support the functions of the S1 interface and comprise Elementary Procedures (EPs). An EP is a unit of interaction between the RAN node 111 and the CN 120. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) 1514 may ensure reliable delivery of signaling messages between the RAN node 111 and the MME 121 based, in part, on the IP protocol, supported by the IP layer 1513. The L2 layer 1512 and the L1 layer 1511 may refer to communication links (e.g., wired or wireless) used by the RAN node and the MME to exchange information.

The RAN node 111 and the MME 121 may utilize an S1-MME interface to exchange control plane data via a protocol stack comprising the L1 layer 1511, the L2 layer 1512, the IP layer 1513, the SCTP layer 1514, and the S1-AP layer 1515.

Figure 16:
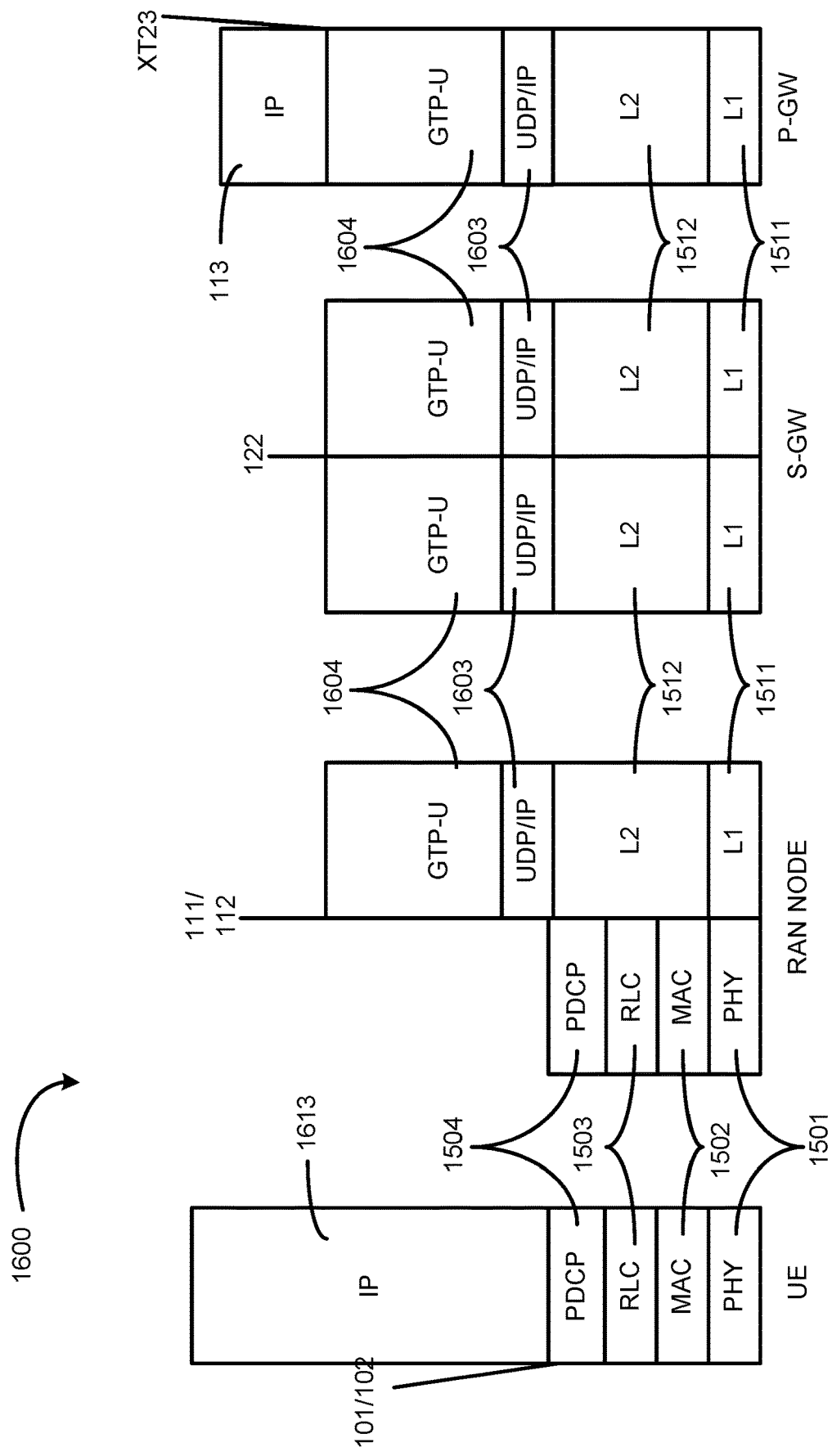
FIG. 16 is a block diagram of an example user plane protocol stack in accordance with some embodiments.

FIG. 16 is an illustration of a user plane protocol stack in accordance with some embodiments. In this embodiment, a user plane 1600 is shown as a communications protocol stack between the UE 101 (or alternatively, the UE 102), the RAN node 111 (or alternatively, the RAN node 112), the S-GW 122, and the P-GW 123. The user plane 1600 may utilize at least some of the same protocol layers as the control plane 1500. For example, the UE 101 and the RAN node 111 may utilize a Uu interface (e.g., an LTE-Uu interface) to exchange user plane data via a protocol stack comprising the PHY layer 1501, the MAC layer 1502, the RLC layer 1503, the PDCP layer 1504.

The General Packet Radio Service (GPRS) Tunneling Protocol for the user plane (GTP-U) layer 1604 may be used for carrying user data within the GPRS core network and between the radio access network and the core network. The user data transported can be packets in any of IPv4, IPv6, or PPP formats, for example. The UDP and IP security (UDP/IP) layer 1603 may provide checksums for data integrity, port numbers for addressing different functions at the source and destination, and encryption and authentication on the selected data flows. The RAN node 111 and the S-GW 122 may utilize an S1-U interface to exchange user plane data via a protocol stack comprising the L1 layer 1511, the L2 layer 1512, the UDP/IP layer 1603, and the GTP-U layer 1604. The S-GW 122 and the P-GW 123 may utilize an S5/S8a interface to exchange user plane data via a protocol stack comprising the L1 layer 1511, the L2 layer 1512, the UDP/IP layer 1603, and the GTP-U layer 1604. As discussed above with respect to FIG. 15, NAS protocols support the mobility of the UE 101 and the session management procedures to establish and maintain IP connectivity between the UE 101 and the P-GW 123.

Figure 17:
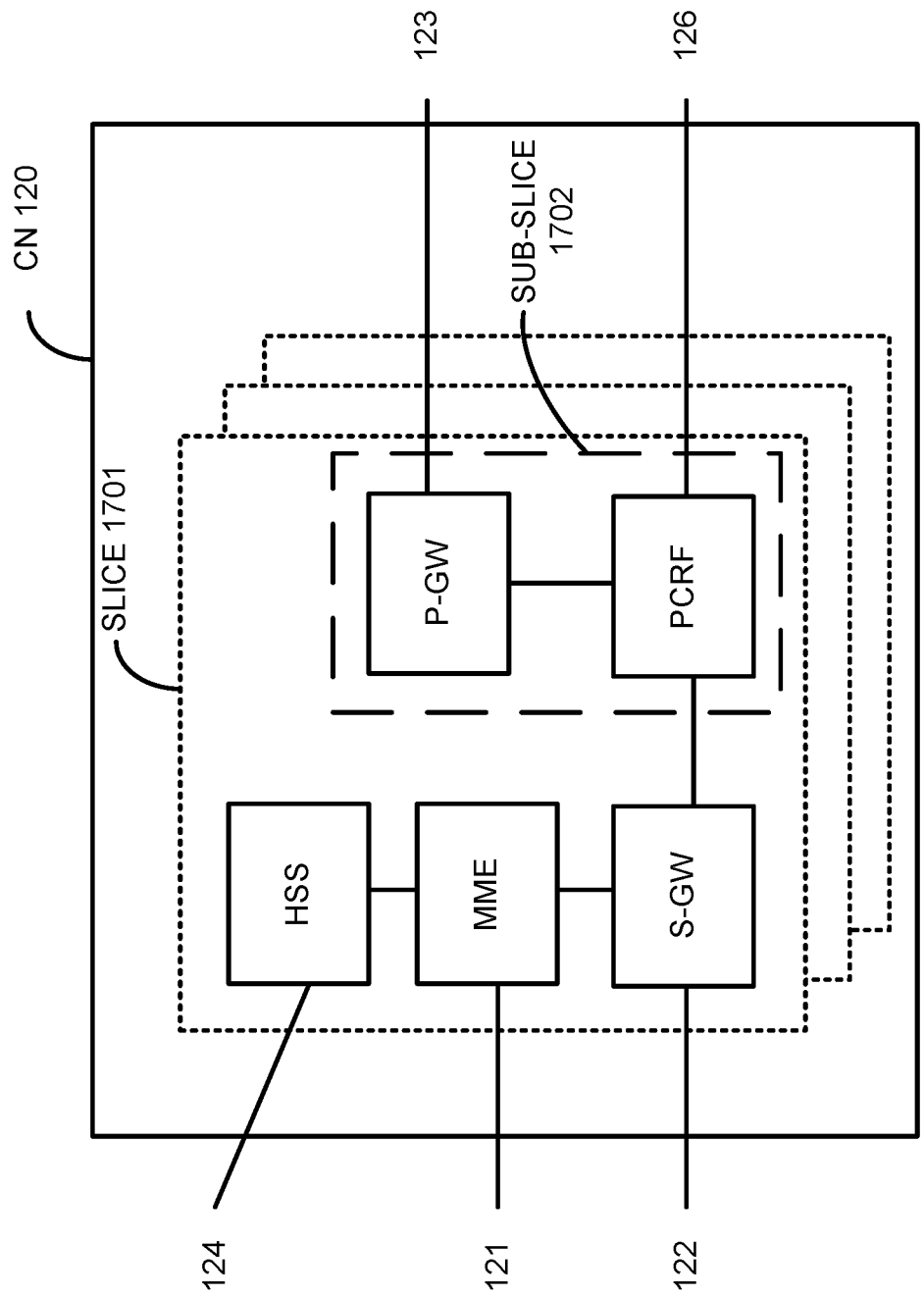
FIG. 17 illustrates components of a core network in accordance with some embodiments.

FIG. 17 illustrates components of a core network in accordance with some embodiments. The components of the CN 120 may be implemented in one physical node or separate physical nodes including components to read and execute instructions from a machine-readable or computer-readable medium (e.g., a non-transitory machine-readable storage medium). In some embodiments, Network Functions Virtualization (NFV) is utilized to virtualize any or all of the above described network node functions via executable instructions stored in one or more computer readable storage mediums (described in further detail below). A logical instantiation of the CN 120 may be referred to as a network slice 1701. A logical instantiation of a portion of the CN 120 may be referred to as a network sub-slice 1702 (e.g., the network sub-slice 1702 is shown to include the PGW 123 and the PCRF 126).

NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 18:
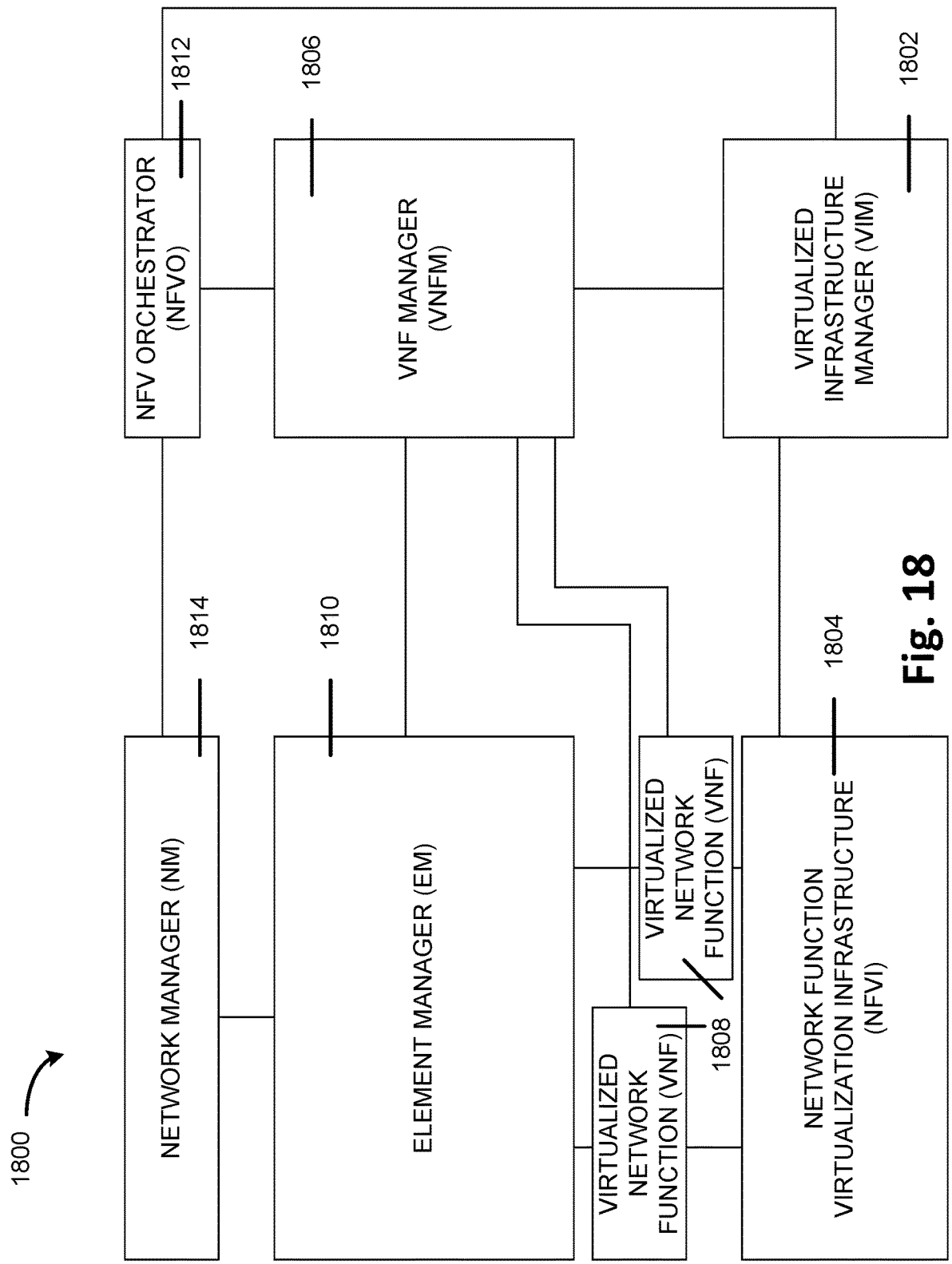
FIG. 18 is a block diagram illustrating components, according to some example embodiments, of a system to support Network Functions Virtualization (NFV)

FIG. 18 is a block diagram illustrating components, according to some example embodiments, of a system 1800 to support NFV. The system 1800 is illustrated as including a virtualized infrastructure manager (VIM) 1802, a network function virtualization infrastructure (NFVI) 1804, a VNF manager (VNFM) 1806, virtualized network functions (VNFs) 1808, an element manager (EM) 1810, an NFV Orchestrator (NFVO) 1812, and a network manager (NM) 1814.

The VIM 1802 manages the resources of the NFVI 1804. The NFVI 1804 can include physical or virtual resources and applications (including hypervisors) used to execute the system 1800. The VIM 1802 may manage the life cycle of virtual resources with the NFVI 1804 (e.g., creation, maintenance, and tear down of virtual machines (VMs) associated with one or more physical resources), track VM instances, track performance, fault and security of VM instances and associated physical resources, and expose VM instances and associated physical resources to other management systems.

The VNFM 1806 may manage the VNFs 1808. The VNFs 1808 may be used to execute EPC components/functions. The VNFM 1806 may manage the life cycle of the VNFs 1808 and track performance, fault and security of the virtual aspects of VNFs 1808. The EM 1810 may track the performance, fault and security of the functional aspects of VNFs 1808. The tracking data from the VNFM 1806 and the EM 1810 may comprise, for example, performance measurement (PM) data used by the VIM 1802 or the NFVI 1804. Both the VNFM 1806 and the EM 1810 can scale up/down the quantity of VNFs of the system 1800.

The NFVO 1812 may coordinate, authorize, release and engage resources of the NFVI 1804 in order to provide the requested service (e.g., to execute an EPC function, component, or slice). The NM 1814 may provide a package of end-user functions with the responsibility for the management of a network, which may include network elements with VNFs, non-virtualized network functions, or both (management of the VNFs may occur via the EM 1810).

Figure 19:
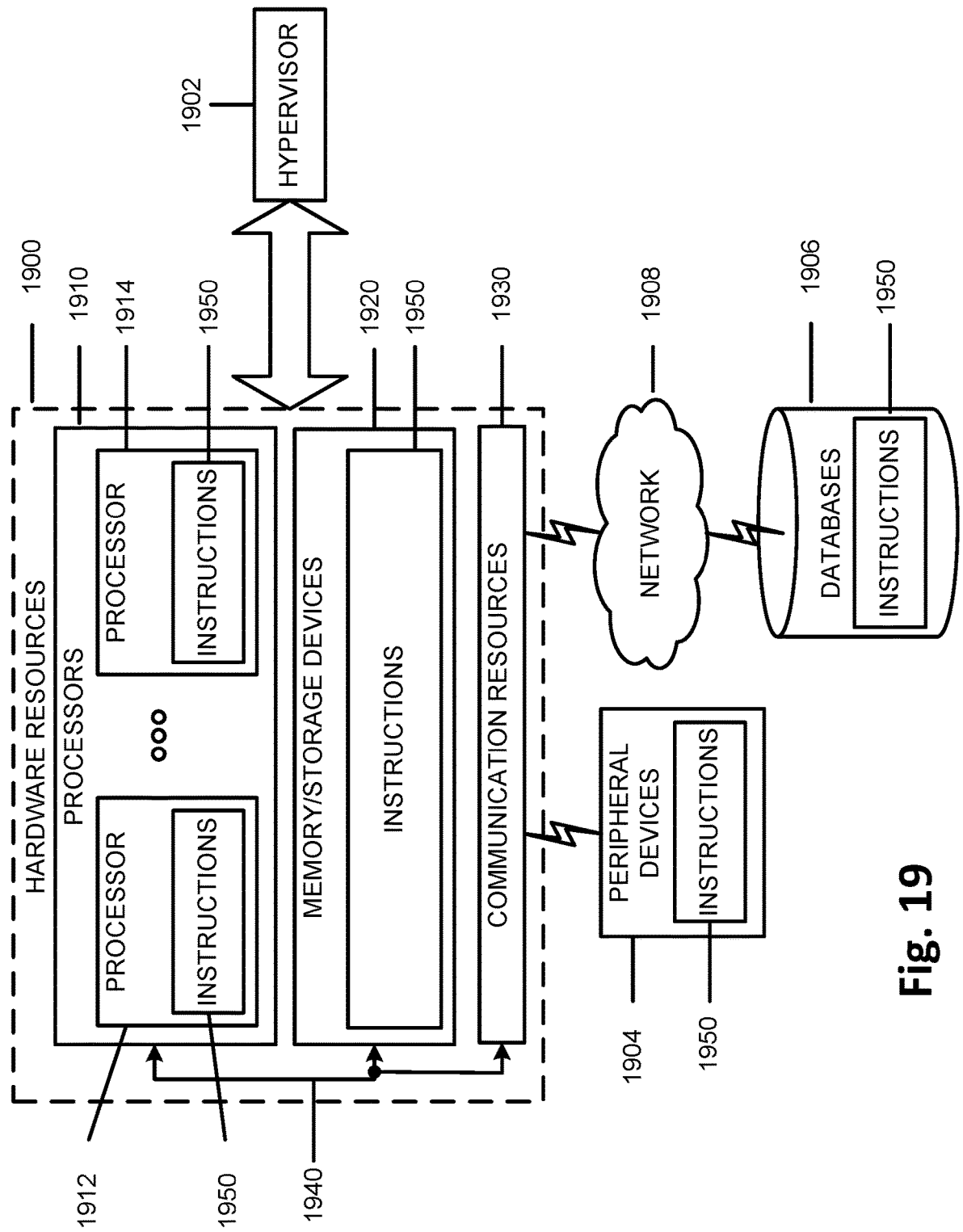
FIG. 19 is a block diagram of example components, according to some example embodiments, able to read instructions from a machine-readable or computer-readable medium (e.g., a non-transitory machine-readable storage medium) and perform any one or more of the methodologies discussed herein.

FIG. 19 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 19 shows a diagrammatic representation of hardware resources 1900 including one or more processors (or processor cores) 1910, one or more memory/storage devices 1920, and one or more communication resources 1930, each of which may be communicatively coupled via a bus 1940. For embodiments where node virtualization (e.g., NFV) is utilized, a hypervisor 1902 may be executed to provide an execution environment for one or more network slices/sub-slices to utilize the hardware resources 1900

The processors 1910 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1912 and a processor 1914.

The memory/storage devices 1920 may include main memory, disk storage, or any suitable combination thereof. The memory/storage devices 1920 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1930 may include interconnection or network interface components or other suitable devices to communicate with one or more peripheral devices 1904 or one or more databases 1906 via a network 1908. For example, the communication resources 1930 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1950 may comprise software, a program, an application, an applet, an app, or other executable code for causing at least any of the processors 1910 to perform any one or more of the methodologies discussed herein. The instructions 1950 may reside, completely or partially, within at least one of the processors 1910 (e.g., within the processor's cache memory), the memory/storage devices 1920, or any suitable combination thereof. Furthermore, any portion of the instructions 1950 may be transferred to the hardware resources 1900 from any combination of the peripheral devices 1904 or the databases 1906. Accordingly, the memory of processors 1910, the memory/storage devices 1920, the peripheral devices 1904, and the databases 1906 are examples of computer-readable and machine-readable media.

A number of examples, relating to embodiments of the techniques described above, will next be given.

In a first example, an apparatus of a User Equipment (UE), comprising: an interface to radio frequency (RF) circuitry; and one or more processors that are controlled to: assess a radio link quality of a plurality of frames for communication, via the interface to the RF circuitry, with a radio access network (RAN) node; when the radio link quality of a frame, of the plurality of frames, is below an out-of-sync (OOS) threshold, indicate that the frame is OOS; and when the radio link quality of a frame, of the plurality of frames, is above an in-sync (IS) threshold, indicate that the frame is IS.

In example 2, the subject matter of example 1, or any of the examples herein, wherein radio link monitoring (RLM) is used to assess the radio link quality of the plurality of frames.

In example 3, the subject matter of example 1, or any of the examples herein, wherein the frame is OOS when all resources, of a set of resources for RLM, are below the OOS threshold.

In example 4, the subject matter of example 1, or any of the examples herein, wherein the set of resources include a plurality of reference signals (RSs) relevant to performing RLM for the plurality of frames.

In example 5, the subject matter of example 1, or any of the examples herein, wherein the indication of whether the frame is IS or OOS is made at a physical level.

In example 6, the subject matter of example 1, or any of the examples herein, wherein the indication of whether the frame is IS or OOS made to higher layers.

In a seventh example, an apparatus of a User Equipment (UE), comprising: an interface to radio frequency (RF) circuitry; and one or more processors that are controlled to: process information, received from a radio access network (RAN) node via the interface to the RF circuitry, indicating a partial subframe, of a subframe, to be used to transmit uplink control information (UCI) to the RAN node; perform UCI mapping for using of the partial subframe to transmit UCI via a physical uplink control channel (PUSCH); and communicate, to the RAN node, via the interface to the RF circuitry, in accordance with the partial subframe.

In example 8, the subject matter of example 7, or any of the examples herein, wherein the one or more processors are further controlled to: implement multiplexing to transmit the UCI via the partial subframe.

In example 9, the subject matter of example 7, or any of the examples herein, wherein the one or more processors are further controlled to: perform UCI mapping regarding the use of the partial subframe to transmit UCI via a physical uplink control channel.

In example 10, the subject matter of example 7, or any of the examples herein, wherein a second slot of subframe is assumed to be part of the partial subframe.

In example 11, the subject matter of example 7, or any of the examples herein, wherein the partial subframe includes an ending position at symbol 3 of the subframe.

In example 12, the subject matter of example 7, or any of the examples herein, wherein the partial subframe includes a starting position at 25 microseconds (25 µs) after a start of symbol 7 of the subframe.

In example 13, the subject matter of example 7, or any of the examples herein, wherein the partial subframe includes a starting position at 25 µs plus a timing advance (TA) after the start of symbol 7 of the subframe.

In example 14, the subject matter of example 7, or any of the examples herein, wherein the starting position includes at least a portion of symbol 8 of the subframe.

In example 15, the subject matter of example 7, or any of the examples herein, wherein a PUSCH transmission involving one slot corresponds to a transport block size (TBS) scaling factor of 0.5.

In example 16, the subject matter of example 7, or any of the examples herein, wherein a PUSCH transmission involving a slot duration of 8 to 10 symbols corresponds to a TBS scaling factor of ⅝.

In example 17, the subject matter of example 7, or any of the examples herein, wherein a PUSCH transmission involving a slot duration of 11 to 13 symbols corresponds to a TBS scaling factor of ⅞.

In example 18, the subject matter of example 7, or any of the examples herein, wherein a PUSCH transmission that ends at symbol 3 corresponds to a TBS scaling factor of ⅛.

In example 19, the subject matter of example 7, or any of the examples herein, wherein prior to receiving the information indicating the partial subframe to be used to transmit uplink control information (UCI) to the RAN node, the one or more processors are controlled to: perform a listen-before-talk (LBT) procedure as though an entirety of the subframe is available for UL transmissions.

In a twentieth example, a computer-readable medium containing program instructions for causing one or more processors, associated with a Mobility Management Entity (MME), to: assess a radio link quality of a plurality of frames for communication with a radio access network (RAN) node; when the radio link quality of a frame, of the plurality of frames, is below an out-of-sync (OOS) threshold, indicate that the frame is OOS; and when the radio link quality of a frame, of the plurality of frames, is above an in-sync (IS) threshold, indicate that the frame is IS.

In example 21, the subject matter of example 20, or any of the examples herein, wherein radio link monitoring (RLM) is used to assess the radio link quality of the plurality of frames.

In example 22, the subject matter of example 20, or any of the examples herein, wherein the frame is OOS when all resources, of a set of resources for RLM, are below the OOS threshold.

In example 23, the subject matter of example 20, or any of the examples herein, wherein the set of resources include a plurality of reference signals (RSs) relevant to performing RLM for the plurality of frames.

In example 24, the subject matter of example 20, or any of the examples herein, wherein the indication of whether the frame is IS or OOS is made at a physical level.

In example 25, the subject matter of example 20, or any of the examples herein, wherein the indication of whether the frame is IS or OOS made to higher layers.

In a twenty-sixth example, a computer-readable medium containing program instructions for causing one or more processors, associated with a Radio Access Network (RAN) node, to: process information, received from a radio access network (RAN) node, indicating a partial subframe, of a subframe, to be used to transmit uplink control information (UCI) to the RAN node; perform UCI mapping for using of the partial subframe to transmit UCI via a physical uplink control channel (PUSCH); and communicate, to the RAN node in accordance with the partial subframe.

In example 27, the subject matter of example 26, or any of the examples herein, wherein the one or more processors are further controlled to: implement multiplexing to transmit the UCI via the partial subframe.

In example 28, the subject matter of example 26, or any of the examples herein, wherein the one or more processors are further controlled to: perform UCI mapping regarding the use of the partial subframe to transmit UCI via a physical uplink control channel.

In example 29, the subject matter of example 26, or any of the examples herein, wherein a second slot of subframe is assumed to be part of the partial subframe.

In example 30, the subject matter of example 26, or any of the examples herein, wherein the partial subframe includes an ending position at symbol 3 of the subframe.

In example 31, the subject matter of example 26, or any of the examples herein, wherein the partial subframe includes a starting position at 25 microseconds (25 µs) after a start of symbol 7 of the subframe.

In example 32, the subject matter of example 26, or any of the examples herein, wherein the partial subframe includes a starting position at 25 µs plus a timing advance (TA) after the start of symbol 7 of the subframe.

In example 33, the subject matter of example 26, or any of the examples herein, wherein the starting position includes at least a portion of symbol 8 of the subframe.

In example 34, the subject matter of example 26, or any of the examples herein, wherein a PUSCH transmission involving one slot corresponds to a transport block size (TBS) scaling factor of 0.5.

In example 35, the subject matter of example 26, or any of the examples herein, wherein a PUSCH transmission involving a slot duration of 8 to 10 symbols corresponds to a TBS scaling factor of ⅝.

In example 36, the subject matter of example 26, or any of the examples herein, wherein a PUSCH transmission involving a slot duration of 11 to 13 symbols corresponds to a TBS scaling factor of ⅞.

In example 37, the subject matter of example 26, or any of the examples herein, wherein a PUSCH transmission that ends at symbol 3 corresponds to a TBS scaling factor of ⅛.

In example 38, the subject matter of example 26, or any of the examples herein, wherein prior to receiving the information indicating the partial subframe to be used to transmit uplink control information (UCI) to the RAN node, the one or more processors are controlled to: perform a listen-before-talk (LBT) procedure as though an entirety of the subframe is available for UL transmissions.

In a thirty-ninth example, an apparatus of a User Equipment (UE), comprising: means for assessing a radio link quality of a plurality of frames for communication with a radio access network (RAN) node; when the radio link quality of a frame, of the plurality of frames, is below an out-of-sync (OOS) threshold, means for indicating that the frame is OOS; and when the radio link quality of a frame, of the plurality of frames, is above an in-sync (IS) threshold, means for indicating that the frame is IS.

In example 40, the subject matter of example 39, or any of the examples herein, wherein radio link monitoring (RLM) is used to assess the radio link quality of the plurality of frames.

In example 41, the subject matter of example 39, or any of the examples herein, wherein the frame is OOS when all resources, of a set of resources for RLM, are below the OOS threshold.

In example 42, the subject matter of example 39, or any of the examples herein, wherein the set of resources include a plurality of reference signals (RSs) relevant to performing RLM for the plurality of frames.

In example 43, the subject matter of example 39, or any of the examples herein, wherein the indication of whether the frame is IS or OOS is made at a physical level.

In example 44, the subject matter of example 39, or any of the examples herein, wherein the indication of whether the frame is IS or OOS made to higher layers.

In a forty-fifth example, a method, performed by User Equipment (UE), comprising: assessing a radio link quality of a plurality of frames for communication with a radio access network (RAN) node; when the radio link quality of a frame, of the plurality of frames, is below an out-of-sync (OOS) threshold, indicating that the frame is OOS; and when the radio link quality of a frame, of the plurality of frames, is above an in-sync (IS) threshold, indicating that the frame is IS.

In example 46, the subject matter of example 45, or any of the examples herein, wherein radio link monitoring (RLM) is used to assess the radio link quality of the plurality of frames.

In example 47, the subject matter of example 45, or any of the examples herein, wherein the frame is OOS when all resources, of a set of resources for RLM, are below the OOS threshold.

In example 48, the subject matter of example 45, or any of the examples herein, wherein the set of resources include a plurality of reference signals (RSs) relevant to performing RLM for the plurality of frames.

In example 49, the subject matter of example 45, or any of the examples herein, wherein the indication of whether the frame is IS or OOS is made at a physical level.

In example 50, the subject matter of example 45, or any of the examples herein, wherein the indication of whether the frame is IS or OOS made to higher layers.

In the preceding specification, various embodiments have been described with reference to the accompanying drawings. It will, however, be evident that various modifications and changes may be made thereto, and additional embodiments may be implemented, without departing from the broader scope as set forth in the claims that follow. The specification and drawings are accordingly to be regarded in an illustrative rather than restrictive sense.

For example, while series of signals and/or operations have been described with regard to FIG. 9 the order of the signals/operations may be modified in other implementations. Further, non-dependent signals may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to be limiting. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used.

What is claimed is:

1. An apparatus of a User Equipment (UE), comprising:
an interface to radio frequency (RF) circuitry; and
one or more processors that are controlled to:
process instructions, received from a radio access network (RAN) node via the interface to the RF circuitry, to enter a first mode of operation, wherein the UE in the first mode of operation does not engage in listen before talk (LBT) procedures, and one or more partial subframes are used to communicate with the RAN node,
process an indication, received from the RAN node via the interface to the RF circuitry after the instructions are processed, indicating a partial subframe, of a subframe, to be used to transmit uplink control information (UCI) to the RAN node,
wherein while the UE is in the first mode of operation, the one or more processors refrain from performing physical uplink shard channel (PUSCH) transmissions that will be interrupted by the indication of the partial subframe to be used to transmit the UCI to the RAN node,
process additional instructions, received from the RAN node, that trigger the UE to perform UCI multiplexing when the partial subframe has sufficient capacity to transmit the UCI, and
perform UCI mapping for use of the partial subframe to transmit the UCI via a PUSCH transmission,
wherein a slot duration of 11 to 13 symbols used for the PUSCH transmission corresponds to a transport block size (TBS) scaling factor of ⅞.

2. The apparatus of claim 1, wherein the one or more processors are further controlled to: implement multiplexing to transmit the UCI via the partial subframe, wherein the partial subframe is not a largest partial subframe of the subframe.

3. The apparatus of claim 1, wherein the subframe comprises a first slot and a second slot, and the second slot of the subframe is assumed to be part of the partial subframe.

4. The apparatus of claim 1, wherein the partial subframe includes an ending position at a 4th symbol of the subframe.

5. The apparatus of claim 1, wherein the partial subframe includes a starting position at 25 microseconds (25 μs) after a start of an 8th symbol of the subframe.

6. The apparatus of claim 5, wherein the starting position includes at least a portion of an 9th symbol of the subframe.

7. The apparatus of claim 1, wherein the partial subframe includes a starting position at 25 μs plus a timing advance (TA) after a start of an 8th symbol of the subframe.

8. The apparatus of claim 1, wherein one slot used for the PUSCH transmission corresponds to a transport block size (TBS) scaling factor of 0.5.

9. The apparatus of claim 1, wherein a slot duration of 8 to 10 symbols used for the PUSCH transmission corresponds to a transport block size (TBS) scaling factor of ⅝.

10. The apparatus of claim 1, wherein the PUSCH transmission that ends at a 4th symbol corresponds to a transport block size (TBS) scaling factor of ⅛.

11. The apparatus of claim 1, wherein after the instructions are processed and before the indication is processed, the one or more processors are controlled to:
process second instructions, received from the RAN node via the interface to the RF circuitry, to enter a second mode of operation that is discrete from the first mode of operation, wherein the UE in the second mode of operation does engage in the LBT procedures.

12. The apparatus of claim 11, wherein in the second mode of operation the one or more processors are controlled to perform a LBT procedure that is interrupted by the indication of the partial subframe.

13. The apparatus of claim 11, wherein in the second mode of operation the UE employs full subframes to communicate with the RAN node until the indication to use the partial subframe.

14. The apparatus of claim 1, wherein in the first mode of operation the one or more processors are prevented from performing a LBT procedure.

15. The apparatus of claim 1, wherein the one or more processors refrain from performing the PUSCH transmissions comprising the LBT procedures.

* * * * *